United States Patent
Mukunoki et al.

(10) Patent No.: US 9,512,295 B2
(45) Date of Patent: Dec. 6, 2016

(54) POLYMER FILM, AND PHASE DIFFERENCE FILM, POLARIZING PLATE AND LIQUID CRYSTAL DISPLAY DEVICE USING THE SAME

(75) Inventors: Yasuo Mukunoki, Minami-Ashigara (JP); Mamoru Sakurazawa, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 1739 days.

(21) Appl. No.: 12/342,686

(22) Filed: Dec. 23, 2008

(65) Prior Publication Data

US 2009/0169775 A1    Jul. 2, 2009

(30) Foreign Application Priority Data

Dec. 26, 2007    (JP) ................................. 2007-334791

(51) Int. Cl.

| | |
|---|---|
| *C08K 5/11* | (2006.01) |
| *C08J 5/18* | (2006.01) |
| *C08K 5/12* | (2006.01) |
| *G02B 1/10* | (2015.01) |
| *G02B 5/30* | (2006.01) |
| *C08K 5/00* | (2006.01) |

(52) U.S. Cl.
CPC .. *C08K 5/11* (2013.01); *C08J 5/18* (2013.01); *C08K 5/12* (2013.01); *G02B 1/105* (2013.01); *G02B 5/3033* (2013.01); *C08J 2301/10* (2013.01); *C08J 2467/02* (2013.01); *C08K 5/0016* (2013.01); *Y10T 428/105* (2015.01); *Y10T 428/1041* (2015.01)

(58) Field of Classification Search
CPC .. C08J 2467/02; C08J 2301/10; C08K 5/0016; C08K 5/11–5/12; G02B 1/105; G02B 5/3033; Y10T 428/1041; Y10T 428/105
USPC ............ 428/1.3–1.33, 1.5, 1.54; 349/96, 122
See application file for complete search history.

(56) References Cited

U.S. PATENT DOCUMENTS

| | | | |
|---|---|---|---|
| 4,661,622 A * | 4/1987 | Matsumoto | ................... 560/199 |
| 2002/0143137 A1* | 10/2002 | Howie et al. | ................. 528/272 |
| 2006/0045992 A1* | 3/2006 | Michihata et al. | .......... 428/1.31 |
| 2007/0009676 A1* | 1/2007 | Tamagawa | ................. C08J 5/18 |
| | | | 428/1.31 |
| 2007/0053080 A1* | 3/2007 | Harada | ........................ 359/809 |
| 2007/0087167 A1* | 4/2007 | Yoshida | ....................... 428/143 |
| 2007/0247576 A1* | 10/2007 | Tamagawa | ................ C08L 1/10 |
| | | | 349/117 |

FOREIGN PATENT DOCUMENTS

| | | |
|---|---|---|
| JP | 5-197073 A | 8/1993 |
| JP | 07-018167 A | 1/1995 |
| JP | 11-228771 A | 8/1999 |
| JP | 2002-022956 A | 1/2002 |
| JP | 2007-003679 A | 1/2007 |
| JP | 2007-269850 A | 10/2007 |

OTHER PUBLICATIONS

English Translation of Japanese Official Action issued Jan. 17, 2012 in corresponding Japanese Patent Application No. 2007-334791.

* cited by examiner

*Primary Examiner* — Sophie Hon
(74) *Attorney, Agent, or Firm* — Buchanan, Ingersoll & Rooney PC

(57) ABSTRACT

There is provided a polymer film including a polymer; and a high molecular weight plasticizer that has a number average molecular weight of 700 to 10,000 and has a repeating unit derived from a dicarboxylic acid and a diol, wherein the dicarboxylic acid for forming the high molecular weight plasticizer includes at least one aliphatic dicarboxylic acid having 2 to 20 carbon atoms and at least one aromatic dicarboxylic acid having 8 to 20 carbon atoms, and the diol includes at least one diol selected from the group consisting of an aliphatic diol having 2 to 12 carbon atoms, an alkyl ether diol having 4 to 20 carbon atoms and an aromatic ring-containing diol having 6 to 20 carbon atoms.

11 Claims, No Drawings

POLYMER FILM, AND PHASE DIFFERENCE FILM, POLARIZING PLATE AND LIQUID CRYSTAL DISPLAY DEVICE USING THE SAME

BACKGROUND OF THE INVENTION

1. Field of the Invention

The present invention relates a polymer film. More particularly, the invention relates to a polymer film which causes no smoke generation and no oil contamination at the time of production, is excellent in a surface state and also in trimming and resistance to roll contamination, and can easily control development of optical characteristics. Further, the invention also relates to a phase difference film, a polarizing plate and a liquid crystal display device utilizing the polymer film.

2. Description of the Related Art

Films of polymers represented by cellulose esters, polyesters, polycarbonates, cycloolefin polymers, vinyl polymers, polyimides and the like have been used in silver halide photographic light-sensitive materials, phase difference films, polarizing plates and image display devices. Films more excellent in terms of planarity and uniformity can be produced from these polymers, so that they have been widely employed as films for optical applications. For example, a cellulose ester film having a proper moisture permeability can be directly laminated online to a most commonly used polarizing film comprising polyvinyl alcohol (PVA) and iodine. For this reason, a cellulose acylate, particularly cellulose acetate, has been widely used as protective films for the polarizing plates.

When transparent polymer films are used for the optical applications such as the phase difference films, supports for the phase difference films, the protective films for the polarizing plates and the image display devices, control of their optical anisotropy becomes an extremely important factor to determine the performance (for example, visibility) of display devices.

On the other hand, as methods for producing the transparent polymer films, there have been used solution film forming methods which give a good surface state, or in recent years, there have been also used melt film forming methods. In the case of the solution film forming methods, plasticizers are preferably added in producing the polymer films, for the purpose of imparting high-speed film formability. This is because solvents can be evaporated for a short period of time in drying at the time of the solution film formation by adding the plasticizers, thereby being able to decrease the amount of residual solvents in the polymer films. However, in the plasticizer-containing transparent polymer films which have been generally used, undesirable phenomena occur, or the films are adversely affected, in some cases, when the films are tried to be treated under severe conditions in the production process.

For example, when the transparent polymer films are tried to be treated at high temperature, smoke generation occurs, or the films are contaminated with oils, in some cases. For this reason, production conditions or treatment conditions to the plasticizer-containing transparent polymer films have been constrained as a matter of course. On the other hand, it is known that a high-molecular weight plasticizer is used in a photographic triacetyl cellulose ester film. However, it has been difficult to presume that the film is treated at high temperature and can be applied to the optical applications (see JP-A-5-197073).

As an improvement thereof, there is disclosed a technique of adding a plasticizer selected from a polyester and a polyester ether and having a weight average molecular weight of 400 to 5,000 (see JP-A-2002-022956). There is a description that according to this technique, raw material deposition prevention, moisture permeability and size are excellent. However, process contamination at the time of production and raw material volatility at the time of stretching treatment at high temperature are extremely poor, so that this technique can not be practically used. Further, it is disclosed that a specific plasticizer (aromatic ring-containing polyvalent carboxylic acid ester) is used in combination with a polyester (see JP-A-2007-003679). There is a description that according to this technique, a phase difference plate excellent in polarization degree durability and light leakage prevention can be obtained. These improvements are surely observed. However, not only an improvement level by an effect of using the specific plasticizer together appears to be low, but also process contamination by poor volatility of the specific plasticizer in the process is extremely poor. This is therefore lacking productability.

SUMMARY OF THE INVENTION

As described above, it has hitherto been difficult to find a practical method for producing a desired optical film without undesirable plasticizer contamination in the film forming process and the adverse effect on the film surface state.

An object of the invention is to provide a polymer film which is obtained by a relatively easy operation without the occurrence of smoke generation and oil contamination at the time of production, and can adjust development of retardation, decreases moisture permeability, and shows excellent environmental durability, as an optical film, taking into account the problems of the conventional art as described above. Further, another object of the invention is to provide a phase difference film using such a polymer film, and to provide an excellent polarizing plate and liquid crystal display device.

The present inventors have made intensive studies. As a result, it has been found that the problems of the conventional art can be solved by using a specific plasticizer which meets specific requirements, that is to say, leading to provide the invention described below as means for solving the problems.

(1) A polymer film comprising:
a polymer; and
a high molecular weight plasticizer that has a number average molecular weight of 700 to 10,000 and has a repeating unit derived from a dicarboxylic acid and a diol, wherein
the dicarboxylic acid for forming the high molecular weight plasticizer comprises at least one aliphatic dicarboxylic acid having 2 to 20 carbon atoms and at least one aromatic dicarboxylic acid having 8 to 20 carbon atoms, and
the diol comprises at least one diol selected from the group consisting of an aliphatic diol having 2 to 1.2 carbon atoms, an alkyl ether diol having 4 to 20 carbon atoms and an aromatic ring-containing diol having 6 to 20 carbon atoms.

(2) The polymer film as described in (1), wherein
the aliphatic dicarboxylic acid is a malonic acid, a succinic acid, a glutaric acid, an adipic acid, a sebacic acid, an azelaic acid, a cyclohexanedicarboxylic acid, a maleic acid or a fumaric acid, and
the aromatic dicarboxylic acid is a phthalic acid, an isophthalic acid, a terephthalic acid, a 1,5-naphthalenedicarboxylic acid, a 1,4-naphthalenedicarboxylic acid, a 1,8-naphthalenedicarboxylic acid, a 2,8-naphthalenedicarboxylic acid or a 2,6-naphthalenedicarboxylic acid.

(3 The polymer film as described in (1), wherein the aliphatic diol is an ethanediol, a 1,2-propanediol, a 1,3-propanediol, a 1,2-butanediol, a 1,3-butanediol, a 2-methyl-1,3-propanediol, a 1,4-butanediol, a 1,5-pentanediol, a 2,2-dimethyl-1,3-propanediol (neopentyl glycol), a 1,4-hexanediol, a 1,4-cyclohexanediol or a 1,4-cyclohexanedimethanol, and the aromatic ring-containing diol is a bisphenol A, a 1,4-dihydroxyphenol or a benzene-1,4-dimethanol.

(4) The polymer film as described in (1), wherein at least one end of the high molecular weight plasticizer is at least one selected from the group consisting of an aliphatic group having 1 to 22 carbon atoms, an aromatic ring-containing group having 6 to 20 carbon atoms, an aliphatic carbonyl group having 1 to 22 carbon atoms, and an aromatic carbonyl group having 6 to 20 carbon atoms.

(5) The polymer film as described in (1), wherein the high molecular weight plasticizer contains a component having a number average molecular weigh of 500 or less in an amount of 10% by mass or less.

(6) The polymer film as described in (1), wherein the high molecular weight plasticizer is contained in an amount of 2 to 30% by mass based on an amount of the polymer.

(7) The polymer film as described in (1), wherein the high molecular weight plasticizer has a rate of mass decrease of at least either 5% or less when the high molecular weight plasticizer is heated at 200° C. for 10 minutes or 1% or less when the high molecular weight plasticizer is heated at 140° C. for 60 minutes (8) The polymer film as described in (1), wherein the polymer film is a cellulose ester film prepared by a solution film forming method or a melt film forming method, and having a film thickness of from 20 to 200 μm.

(9) The polymer film as described in (1), wherein the polymer film is stretched 60 to 400% during or after film formation.

(10) The polymer film as described in (1), wherein the polymer film has an in-plane retardation (Re) of 0 to 300 nm, and a retardation in a thickness direction (Rth) of −200 to +300 nm.

(11) A polarizing plate comprising:

at least one polymer film as described in (1).

(12) A liquid crystal display device comprising:

at least one polymer film as described in (1).

DETAILED DESCRIPTION OF THE INVENTION

The polymer film of the invention gives excellent film forming properties and decreases process contamination at the time of production, and is excellent in optical characteristics and environmental dependency. Further, the polymer film can be widely applied to optical applications such as a phase difference film using the polymer film of the invention. Furthermore, the polymer film of the invention has a proper moisture permeability, so that it can be laminated online to a polarizing film. Thus, a polarizing plate having excellent visibility and a liquid crystal display device having high reliability can be provided.

The polymer film of the invention will be described in detail below. Descriptions of constituent features described below are made based on typical embodiments of the invention in some cases, but the invention should not be construed as being limited to such embodiments. Incidentally, the numerical range indicated by "a numerical value to another numerical value" in this specification means the range including the former numerical value as a lower limit and the taller numerical value as an upper limit.

<Production Method of Polymer Film>

[Polymer]

First, polymers which can be used in the polymer film of the invention will be described.

The polymers as a constituent element of the polymer film of the invention include polymers which can constitute a polymer film usable for optical applications and the like, such as cellulose esters (for example, cellulose triacetate, cellulose acetate propionate, cellulose acetate butyrate, cellulose tripropionate and cellulose diacetate), polyolefins (for example, polyethylene, polypropylene and a norbornene-based polymer), polyesters (for example, a polymethacrylic acid ester and a polyacrylic acid ester), polycarbonates, cycloolefin polymers, polyarylates, polysulfones, vinyl polymers (for example, polyvinyl alcohol), polyamides, polyimides, cycloolefin copolymers and polynorbornene. It is preferred that the above-mentioned polymer has a hydrophilic structure such as a hydroxyl group, an amide, an imide or an ester on a main chain or a side chain thereof, in order to achieve a proper moisture permeability. In the invention, there may be used a copolymer or a polymer mixture. As the above-mentioned polymers, cellulose esters are particularly preferred.

When the polymer film of the invention is produced, a powdery or granular polymer can be used as the above-mentioned polymer for a raw material, and further, a pelletized polymer can also be used.

The moisture content of the above-mentioned polymer is preferably 1.0% by mass or less, more preferably 0.7% by mass or less, and most preferably 0.5% by mass or less. Further, the above-mentioned moisture content is preferably 0.2% by mass or less in some cases. When the moisture content of the above-mentioned polymer is not within the preferred range, it is preferred that the above-mentioned polymer is used after dried by a drying air, heat or the like.

These polymers may be used either alone or as a combination of two or more of the polymers.

The above-mentioned cellulose esters include a cellulose ester compound and a compound having an ester-substituted cellulose skeleton obtained by using cellulose as a raw material and introducing a functional group biologically or chemically. As the polymer as a main component of the polymer film of the invention, the above-mentioned cellulose ester is preferably used. When the polymer film comprises a single polymer, the term "polymer as a main component" as used herein means the polymer itself, and when the polymer film comprises a plurality of polymers, it means a polymer having the highest mass fraction of all the constituent polymers.

The above-mentioned cellulose ester is an ester of cellulose and an acid. As the acid constituting the above-mentioned ester, preferred is an organic acid, more preferred is a carboxylic acid, still more preferred is a fatty acid having 2 to 22 carbon atoms, and most preferred is a lower fatty acid having 2 to 4 carbon atoms.

The above-mentioned cellulose acylate is an ester of cellulose and a carboxylic acid. In the above-mentioned cellulose acylate, all or a part of hydrogen atoms of hydroxyl groups present at the 2-, 3- and 6-positions of a glucose unit constituting cellulose are substituted by acyl groups. Examples of the above-mentioned acyl groups include, for example, an acetyl group, a propionyl group, a butyryl group, an isobutyryl group, a pivaloyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, a cyclohexanecarbonyl group, an oleoyl group, a benzoyl group, a naphthylcarbonyl group and a cinnamoyl group. As the above-mentioned acyl group, preferred is an acetyl group, a propionyl group, a butyryl group, a dodecanoyl group, an octadecanoyl group, a pivaloyl group, an oleoyl group, a benzoyl group, a naphthylcarbonyl group or a cinnamoyl group, and most preferred is an acetyl group, a propionyl group or a butyryl group.

The cellulose ester may be an ester of cellulose and a plurality of acids. Further, the cellulose acylate may be substituted by a plurality of acyl groups.

When the degree of substitution of the acetyl groups (having 2 carbon atoms) substituted at the hydroxyl groups of cellulose of the cellulose acylate is taken as SA, and the degree of substitution of the acyl groups with 3 or more carbon atoms substituted at the hydroxyl groups of cellulose is taken as SB, the development of Re of the polymer film of the invention and moisture dependency of retardation can be controlled by adjusting SA and SB.

According to optical characteristics required for the polymer film of the invention, SA+SB is appropriately adjusted, preferably to 2.30<SB≤3.00, more preferably to 2.40≤SA+SB≤2.95, still more preferably to 2.70≤SA+SB≤2.95, and particularly preferably to 2.78≤SA+SB≤2.94. The cellulose ester can be synthesized by known methods.

For example, as for a synthesis method of the cellulose acylate, a fundamental principle is described in Nobuhiko Migita et al., *Wood Chemistry*, pages 180-190 (Kyoritsu Shuppan, 1968).

The polymerization degree of the above-mentioned cellulose acylate is preferably from 150 to 500, more preferably from 200 to 400, and still more preferably from 220 to 350, as the viscosity-average polymerization degree. The above-mentioned viscosity-average polymerization degree can be measured according to a description of a limiting viscosity method of Uda et al. (Kazuo Uda and Hideo Saito, *Sen'i Gakkaishi*, 18 (1), pages 105-120, 1962). A measuring method of the above-mentioned viscosity-average polymerization degree is also described in JP-A-9-95538.

Raw material cotton for the cellulose ester and a synthesis method thereof are also described in JIII Journal of Technical Disclosure (No. 2001-1745, pages 7-12, published on Mar. 15, 2001, Japan Institute of Invention and Innovation).

[High Molecular Weight Plasticizer]
(Characteristics of High Molecular Weight Plasticizer Used in the Invention)

The high molecular weight plasticizer used in the polymer film of the invention is characterized by that it has a molecular weight of 700 to 10,000 and has a repeating unit. Here, the high molecular weight plasticizer comprises a mixture of compounds different in molecular weight, so that the molecular weight thereof is the average molecular weight. In solution casting, the plasticizer is an indispensable raw material for accelerating the volatilization rate of solvent and decreasing the amount of residual solvent. Further, also in the polymer film by a melt film forming method, the plasticizer is a raw material useful for preventing color development or deterioration of film strength. Furthermore, addition of the high molecular weight plasticizer to the polymer film of the invention shows useful effects, from the viewpoints of film modifications such as improvement in mechanical properties, flexibilization, water absorption stabilization and a decrease in moisture permeability. Moreover, in the invention, it is extremely effective for improvement in handling characteristics in a production process, as shown in examples described later.

Here, the high molecular weight plasticizer in the invention is characterized by that it has a repeating unit moiety in a compound thereof. In the high molecular weight plasticizer of the invention, the number average molecular weight thereof is from 700 to 10,000. However, it is preferably from 600 to 8,000, more preferably from 700 to 5,000, and particularly preferably from 1,000 to 3,500.

Further, the high molecular weight plasticizer of the invention may be either liquid or solid under environmental temperature or humidity used. The melting point thereof is distinguished depending on the film forming method. In the case of the solution film formation, the melting point is preferably from −100° C. to 150° C., more preferably from −100° C. to 70° C., and particularly preferably from −100° C. to 50° C. Compared to this, in the case of the melt film formation, the melting point is preferably from −100° C. to 200° C., more preferably from −100° C. to 170° C., and particularly preferably from −100° C. to 150° C.

Furthermore, the less the coloration thereof is, the more preferred it is. In particular, it is preferably colorless. It is preferred that the plasticizer is thermally stable at higher temperatures, and the decomposition starting temperature thereof is preferably 150° C. or more, and more preferably 200° C. or more. The amount thereof added may be any as long as optical and mechanical properties are not adversely affected, and the amount thereof incorporated is appropriately selected within the range of not impairing the object of the invention. The content of the high molecular weight plasticizer in the polymer film of the invention is preferably from 1 to 50% by mass, and more preferably from 2 to 40% by mass, based on the amount of the polymer. In particular, it is preferably from 5 to 30% by mass.

Although the high molecular weight plasticizer used in the invention is described in detail below with reference to specific examples thereof, it is a high molecular weight plasticizer according to the following description.

The high molecular weight plasticizer which can be used in the polymer film of the invention is a high molecular weight plasticizer with a number average molecular weight of 700 to 10,000 having a repeating unit comprising a dicarboxylic acid and a diol, wherein the dicarboxylic acid forming the high molecular weight plasticizer comprises at least one aliphatic dicarboxylic acid having 2 to 20 carbon atoms and at least one aromatic dicarboxylic acid having 8 to 20 carbon atoms, and the diol comprises at least one diol selected from an alkylene diol having 2 to 20 carbon atoms, an alkyl ether diol having 4 to 20 carbon atoms and an aromatic ring-containing diol having 6 to 20 carbon atoms (hereinafter also referred to as an aromatic diol).

The high molecular weight plasticizer used in the invention will be described below. The preferred high molecular weight plasticizer is not particularly limited as long as it is within the range of the invention.

The high molecular weight plasticizer used in the invention is obtained by a reaction of a mixture of an aliphatic dicarboxylic acid having 2 to 20 carbon atoms and an aromatic dicarboxylic acid having 8 to 20 carbon atoms with at least one diol selected from an aliphatic diol having 2 to 12 carbon atoms, an alkyl ether diol having 4 to 20 carbon atoms and an aromatic diol having 6 to 20 carbon atoms. Although both ends of the reaction product may be left as they are, a monocarboxylic acid, a monoalcohol or a phenol may be further allowed to react therewith to perform so-called blocking of the ends. This end blocking is effective in terms of storage stability and the like, particularly when performed for preventing a free carboxylic acid from being contained. The dicarboxylic acid used in the high molecular weight plasticizer of the invention is preferably an aliphatic dicarboxylic acid residue having 4 to 20 carbon atoms or an aromatic dicarboxylic acid residue having 8 to 20 carbon atoms.

The aliphatic dicarboxylic acid having 2 to 20 carbon atoms preferably used in the invention include, for example, oxalic acid, malonic acid, succinic acid, maleic acid, fumaric acid, glutaric acid, adipic acid, pimelic acid, suberic acid, azelaic acid, sebacic acid, dodecanedicarboxylic acid, 1,4-cyclohexanedicarboxylic acid and the like.

Further, the aromatic dicarboxylic acids having 8 to 20 carbon atoms include phthalic acid, terephthalic acid, isophthalic acid, 1,5-naphthalenedicarboxylic acid, 1,4-naphthalenedicarboxylic acid, 1,8-naphthalenedicarboxylic acid, 2,8-naphthalenedicarboxylic acid, 2,6-naphthalenedicarboxylic acid and the like.

Of these, preferred examples of the aliphatic dicarboxylic acids are malonic acid, succinic acid, maleic acid, fumaric acid, glutaric acid, adipic acid, azelaic acid and 1,4-cyclohexanedicarboxylic acid, and preferred examples of the aromatic dicarboxylic acids are phthalic acid, terephthalic acid, isophthalic acid, 1,5-naphthalenedicarboxylic acid and 1,4-naphthalenedicarboxylic acid. Particularly preferred are succinic acid, glutaric acid and adipic acid as the aliphatic dicarboxylic acid component, and phthalic acid, terephthalic acid and isophthalic acid as the aromatic dicarboxylic acid component.

In the invention, at least one of the above-mentioned aliphatic dicarboxylic acids and at least one of the above-mentioned aromatic dicarboxylic acids are used in combination with each other. However, the combination thereof is not particularly limited, and there is no problem even when several kinds of the respective components are used in combination.

Then, the diol or the aromatic ring-containing diol utilized in the high molecular weight plasticizer will be described. It is selected from an aliphatic diol having 2 to 20 carbon atoms, an alkyl ether diol having 4 to 20 carbon atoms and an aromatic ring-containing diol having 6 to 20 carbon atoms.

First, the aliphatic diols having 2 to 20 carbon atoms include alkyl diols and alicyclic diols such as ethanediol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol(neopentyl glycol), 2,2-diethyl-1,3-propanediol(3,3-dimethylolpentane), 2-n-butyl-2-ethyl-1,3-propanediol(3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol and the like. These glycols are used either alone or as a mixture of two or more thereof.

Preferred examples of the aliphatic diols are ethanediol, 1,2-propanediol, 1,3-propanediol, 1,2-butanediol, 1,3-butanediol, 2-methyl-1,3-propanediol, 1,4-butanediol, 1,5-pentanediol, 3-methyl-1,5-pentanediol, 1,6-hexanediol, 1,4-cyclohexanediol and 1,4-cyclohexanedimethanol, and particularly preferred are ethanediol, 1,2-propanediol, 1,3-propanediol, 1,2-butanediol, 1,3-butanediol, 1,4-butanediol, 1,5-pentanediol, 1,6-hexanediol, 1,4-cyclohexanediol and 1,4-cyclohexanedimethanol.

Preferred examples of the alkyl ether diols having 4 to 20 carbon atoms include polytetramethylene ether glycol, polyethylene ether glycol, polypropylene ether glycol and a mixture thereof. The average polymerization degree thereof is not particularly limited. However, it is preferably from 2 to 20, more preferably from 2 to 10, still more preferably from 2 to 5, and particularly preferably from 2 to 4. Examples thereof include a Carbowax resin, a Pluronics resin and a Niax resin as typically useful commercially available polyether glycols.

The aromatic diols having 6 to 20 carbon atoms include but are not particularly limited to bisphenol A, 1,2-hydroxybenzene, 1,3-hydroxybenzene, 1,4-hydroxybenzene and 1,4-benzenedimethanol, and preferred are bisphenol A, 1,4-hydroxybenzene and 1,4-benzenedimethanol.

In the invention, it is particularly preferred that the high molecular weight plasticizer is blocked with alkyl groups or aromatic groups at ends thereof. This is effective for time degradation at high temperature and humidity by protecting the ends with hydrophobic functional groups, and plays a role in retarding hydrolysis of the ester groups.

Both ends of the polyester plasticizer of the invention are preferably protected with monoalcohol residues or monocarboxylic acid residues so as not to become COOH groups or OH groups.

In that case, as the monoalcohol residues, substituted or unsubstituted monoalcohol residues having 1 to 30 carbon atoms are preferred, and include aliphatic alcohols such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodecahexanol, dodecaoctanol, allyl alcohol and oleyl alcohol, and substituted alcohols such as benzyl alcohol and 3-phenyl propanol.

The end blocking alcohol residues which can be preferably used are methanol, ethanol, propanol, isopropanol, butanol, isobutanol, isopentanol, hexanol, isohexanol, cyclohexyl alcohol, isooctanol, 2-ethylhexyl alcohol, isononyl alcohol, oleyl alcohol and benzyl alcohol, and particularly methanol, ethanol, propanol, isobutanol, cyclohexyl alcohol, 2-ethylhexyl alcohol, isononyl alcohol and benzyl alcohol.

Further, when the ends are blocked with the monocarboxylic acid residues, monocarboxylic acids used as the monocarboxylic acid residues are preferably substituted or unsubstituted monocarboxylic acids having 1 to 30 carbon atoms. These may be either aliphatic monocarboxylic acids or aromatic ring-containing monocarboxylic acids. First, the preferred aliphatic monocarboxylic acids will be described. They include acetic acid, propionic acid, butanoic acid, caprylic acid, caproic acid, decanoic acid, dodecanoic acid, stearic acid and oleic acid. The aromatic ring-containing monocarboxylic acids include, for example, benzoic acid, p-tert-butylbenzoic acid, p-tert-amylbenzoic acid, o-toluic acid, m-toluic acid, p-toluic acid, dimethylbenzoic acid, ethylbenzoic acid, n-propylbenzoic acid, aminobenzoic acid, acetoxybenzoic acid and the like, and these may be used either alone or as a combination of two or more thereof.

Such a high molecular weight plasticizer of the invention can be easily synthesized in the usual manner by either one of a heat-melt condensation method by an esterification reaction or an ester exchange reaction of the above-mentioned dicarboxylic acid and diol with the end blocking monocarboxylic acid or monoalcohol as needed and an interface condensation reaction of an acid chloride of the acid and the glycol. For these polyester-based plasticizers, there is a detailed description in "Kaso-zai Sono Riron to Ouyou (Plasticizers—The Theory and Application Thereof)" edited by Koichi Murai (Saiwai Shobo, the first edition, published on Mar. 1, 1973). Further, raw materials described in JP-A-05-155809, JP-A-05-155810, JP-A-05-197073, JP-A-2006-259494, JP-A-07-330670, JP-A-2006-342227, JP-A-2007-003679 and the like can also be used.
(Other Polymer-Based Plasticizers)

In the invention, not only the above-mentioned polyester-based plasticizers but also other polymer-based plasticizers can be used. The polymer-based plasticizers include polyesterpolyurethane-based plasticizers, aliphatic hydrocarbon-based polymers, alicyclic hydrocarbon polymers, acrylic polymers such as a polyacrylic acid ester and a polymethacrylic acid ester (a methyl group, an ethyl group, a propyl group, a butyl group, an isobutyl group, a pentyl group, a hexyl group, a cyclohexyl group, an octyl group, a 2-ethylhexyl group, a nonyl group, an isononyl group, a tert-nonyl group, a dodecyl group, a tridecyl group, a stearyl group, an oleyl group, a benzyl group, a phenyl group or the like as an ester group), vinyl-based polymers such as polyvinyl isobutyl ether and poly(N-vinylpyrrolidone), styrenic polymers such as polystyrene and poly(4-hydroxystyrene), polyethers such as polyethylene oxide and polypropylene oxide, polyamides, polyurethanes, polyureas, phenol-formaldehyde condensates, urea-formaldehyde condensates, polyvinyl acetate and the like.

Of these, it is particularly preferred to use the acrylic polymer together. In the invention, the acrylic polymer is preferably a homopolymer or a copolymer synthesized from a monomer such as an alkyl acrylate or methacrylate. The acrylic acid ester monomers having no aromatic ring include, for example, methyl acrylate, ethyl acrylate, propyl (i-, n-) acrylate, butyl (n-, i-, s-, t-) acrylate, pentyl (n-, i-, s-) acrylate, hexyl (n-, i-) acrylate, heptyl (n-, i-) acrylate, octyl (n-, i-) acrylate, nonyl (n-, i-) acrylate, myristyl (n-, i-) acrylate, 2-ethylhexyl acrylate, ε-caprolactone acrylate, 2-hydroxyethyl acrylate, 2-hydroxypropyl acrylate, 3-hydroxypropyl acrylate, 4-hydroxybutyl acrylate, 2-hydroxybutyl acrylate, 2-methoxyethyl acrylate and 2-ethoxyethyl acrylate. Further, the methacrylic acid ester monomers having no aromatic ring include methacrylic acid esters corresponding to the above-mentioned acrylic acid esters. Furthermore, the acrylic monomers used in the acrylic polymer having an aromatic ring include styrene, methylstyrene, hydroxystyrene and the like.

In addition, when the above-mentioned acrylic polymer is a copolymer, it comprises X (a hydrophilic group-containing monomer component) and Y (a hydrophilic group-free monomer component), and X:Y is preferably from 1:1 to 1:99. The content of the acrylic polymer is preferably from 1 to 20% by mass based on the cellulose ester. These acrylic polymers can be synthesized with reference to a method described in JP-A-2003-12859.
(Specific Examples of Polymer Plasticizers)

Preferred specific examples of the polymer plasticizers are described below, but the polymer plasticizers which can be used in the invention should not be construed as being limited thereto.

PP-1: A condensate comprising succinic acid/phthalic acid/ethanediol (molar ratio: 1/1/2) (number average molecular weight: 2,500).

PP-2: A condensate comprising glutaric acid/isophthalic acid/1,3-propanediol (molar ratio: 1/1/2) (number average molecular weight: 1,300).

PP-3: A condensate comprising adipic acid/terephthalic acid/1,2-propanediol (molar ratio: 1/1/2) (number average molecular weight: 900).

PP-4: A condensate comprising succinic acid/terephthalic acid/ethanediol/1,4-cyclohexanedimethanol (molar ratio: 1/1/1/1) (number average molecular weight: 3,000).

PP-5: A condensate comprising succinic acid/glutaric acid/adipic acid/terephthalic acid/isophthalic acid/ethanediol/1,2-propanediol (molar ratio: 1/1/1/1/1/3/2) (number average molecular weight: 2,500).

PP-6: A condensate comprising succinic acid/adipic acid/terephthalic acid/ethanediol/1,2-propanediol (molar ratio: 1/1/1/2/1) (number average molecular weight: 2,500).

PP-7: A condensate comprising succinic acid/adipic acid/1,4-naphthalenedicarboxylic acid/ethanediol/1,2-propanediol (molar ratio: 1/1/1/2/1) (number average molecular weight: 2,000).

PP-8: A condensate comprising succinic acid/terephthalic acid/polypropylene ether glycol (average polymerization degree: 5)/1,2-propanediol (molar ratio: 2/1/1/2) (number average molecular weight: 2,500).

PP-9: A condensate comprising succinic acid/terephthalic acid/polyethylene ether glycol (average polymerization degree: 3)/1,2-propanediol (molar ratio: 1/3/2/2) (number average molecular weight: 3,500).

PP-10: A condensate comprising succinic acid/phthalic acid/ethanediol (molar ratio: 1/1/2) (number average molecular weight: 2,100), both ends of which are butyl-esterified.

PP-11: A condensate comprising glutaric acid/isophthalic acid/1,3-propanediol (molar ratio: 1/1/2) (number average molecular weight: 1,500), both ends of which are cyclohexyl-esterified.

PP-12: A condensate comprising adipic acid/terephthalic acid/1,2-propanediol (molar ratio: 1/1/2) (number average molecular weight: 2,500), both ends of which are 2-ethylhexyl-esterified.

PP-13: A condensate comprising succinic acid/terephthalic acid/ethanediol/1,4-cyclohexanedimethanol (molar ratio: 1/1/1/1) (number average molecular weight: 3,000), both ends of which are isononyl-esterified.

PP-14: A condensate comprising succinic acid/glutaric acid/adipic acid/terephthalic acid/isophthalic acid/ethanediol/1,2-propanediol (molar ratio: 1/1/1/1/1/3/2) (number average molecular weight: 3,000), both ends of which are propyl-esterified.

PP-15: A condensate comprising succinic acid/adipic acid/terephthalic acid/ethanediol/1,2-propanediol (molar ratio: 1/1/1/2/1) (number average molecular weight: 3,000), both ends of which are 2-ethylhexyl-esterified.

PP-16: A condensate comprising succinic acid/adipic acid/1,4-naphthalenedicarboxylic acid/ethanediol/1,2-propanediol (molar ratio: 1/1/1/2/1) (number average molecular weight: 3,000), both ends of which are benzyl-esterified.

PP-17: A condensate comprising succinic acid/terephthalic acid/polypropylene ether glycol (average polymerization degree: 5)/1,2-propanediol (molar ratio: 2/1/1/2) (number average molecular weight: 3,500), both ends of which are 2-ethylhexyl-esterified.

PP-18: A condensate comprising succinic acid/terephthalic acid/polyethylene ether glycol (average polymerization degree: 4)/1,2-propanediol (molar ratio: 1/3/2/2) (number average molecular weight: 2,500), both ends of which are 2-ethylhexyl-esterified.

PP-19: A condensate comprising succinic acid/phthalic acid/ethanediol (molar ratio: 1/1/2) (number average molecular weight: 2,500), both ends of which are acetyl-esterified.

PP-20: A condensate comprising glutaric acid/isophthalic acid/1,3-propanediol (molar ratio: 1/1/2) (number average molecular weight: 1,300), both ends of which are acetyl-esterified.

PP-21: A condensate comprising adipic acid/terephthalic acid/1,2-propanediol (molar ratio: 1/1/2) (number average molecular weight: 900), both ends of which are benzoyl-esterified.

PP-22: A condensate comprising succinic acid/terephthalic acid/ethanediol/1,4-cyclohexanedimethanol (molar ratio: 1/1/1/1) (number average molecular weight: 3,000), both ends of which are propionyl-esterified.

PP-23: A condensate comprising succinic acid/glutaric acid/adipic acid/terephthalic acid/isophthalic acid/ethanediol/1,2-propanediol (molar ratio: 1/1/1/1/2/3/3) (number average molecular weight: 2,500), both ends of which are cyclohexanecarbonyl-esterified.

PP-24: A condensate comprising succinic acid/terephthalic acid/polyethylene ether glycol (average polymerization degree: 3)/1,2-propanediol (molar ratio: 1/3/2/2) (number average molecular weight: 2,500), both ends of which are acetyl-esterified.

PP-25: A condensate comprising succinic acid/bisphenol A (molar ratio: 1/1) (number average molecular weight: 2,000).

PP-26: A condensate comprising succinic acid/terephthalic acid/ethanediol/bisphenol A (molar ratio: 2/1/1/2) (number average molecular weight: 2,500).

PP-27: A condensate comprising succinic acid/2,6-naphthalenedicarboxylic acid/bisphenol A/propanediol (molar ratio: 1/2/2/1) (number average molecular weight: 1,900).

PP-28: A condensate comprising succinic acid/adipic acid/2,6-naphthalenedicarboxylic acid/bisphenol A/diethylene glycol (molar ratio: 1/1/2/2/2) (number average molecular weight: 2,500).

PP-29: A condensate comprising succinic acid/terephthalic acid/ethanediol/bisphenol A (molar ratio: 2/1/1/2) (number average molecular weight: 2,500), both ends of which are 2-ethylhexyl-esterified.

PP-30: A condensate comprising succinic acid/2,6-naphthalenedicarboxylic acid/bisphenol A/propanediol (molar ratio: 1/2/2/1) (number average molecular weight: 2,300), both ends of which are 2-ethylhexyl-esterified.

PP-31: A condensate comprising succinic acid/bisphenol A (molar ratio: 1/1) (number average molecular weight: 2,200), both ends of which are acetyl-esterified.

In these specific raw materials described above, it has been confirmed that the existing amount of materials having a number average molecular weight of 500 or less is 10% by mass or less. Further, the rate of mass decrease at the time when all are heated at 200° C. for 10 minutes by a thermobalance method is 5% or less. Furthermore, it has also been confirmed that the rate of mass decrease at the time when heated at 140° C. for 60 minutes is 1% or less.

[Polymer Solution]

The polymer film used in the invention can be prepared, for example, from a polymer solution containing the above-mentioned and various additives by a solution casting film forming method or a melt film forming method. The polymer solution which can be used in the solution casting film forming method will be explained below.

(Solvent)

As a main solvent of the polymer solution (preferably, a cellulose ester solution) used for preparing the polymer film of the invention by the solution film forming method, there can be preferably used an organic solvent which is a good solvent for the polymer. Such an organic solvent is preferably an organic solvent having a boiling point of 80° C. or less from the viewpoint of a reduction in drying load. The boiling point of the above-mentioned organic solvent is more preferably from 10 to 80° C., and particularly preferably from 20 to 60° C. Further, an organic solvent having a boiling point of 30 to 45° C. can also be suitably used as the above-mentioned main solvent in some cases.

Such main solvents include a halogenated hydrocarbon, an ester, a ketone, an ether, an alcohol, a hydrocarbon and the like, and these may have a branched structure or a cyclic structure. Further, the above-mentioned main solvent may have two or more of the functional groups of the ester, ketone, ether and alcohol (that is to say, —O—, —CO—, —COO— and —OH). Furthermore, hydrogen atoms of hydrocarbon moieties of the above-mentioned ester, ketone, ether and alcohol may be substituted by halogen atoms (particularly, fluorine atoms). Incidentally, the main solvent of the polymer solution (preferably, the cellulose ester solution) used for preparing the polymer film of the invention means, when the main solvent comprises a single solvent, that solvent, and when the main solvent comprises a plurality of solvents, a solvent having the highest mass fraction of the constituent solvents. The main solvents suitably include a halogenated hydrocarbon.

The above-mentioned halogenated hydrocarbon is more preferably a chlorinated hydrocarbon. Examples thereof include dichloromethane, chloroform and the like, and dichloromethane is more preferred. The above-mentioned esters include, for example, methyl formate, ethyl formate, methyl acetate, ethyl acetate and the like. The above-mentioned ketones include, for example, acetone, methyl ethyl ketone and the like.

The above-mentioned ethers include, for example, diethyl ether, methyl tert-butyl ether, diisopropyl ether, dimethoxymethane, 1,3-dioxolane, 4-methyldioxolane, tetrahydrofuran, methyltetrahydrofuran, 1,4-dioxane and the like. The above-mentioned alcohols include, for example, methanol, ethanol, 2-propanol and the like. The above-mentioned hydrocarbons include, for example, n-pentane, cyclohexane, n-hexane, benzene, toluene and the like.

Organic solvents used together with these main solvents include a halogenated hydrocarbon, an ester, a ketone, an ether, an alcohol, a hydrocarbon and the like, and these may have a branched structure or a cyclic structure. Further, the above-mentioned organic solvent may have two or more of the functional groups of the ester, ketone, ether and alcohol (that is to say, —O—, —CO—, —COO— and —OH). Furthermore, hydrogen atoms of hydrocarbon moieties of the above-mentioned ester, ketone, ether and alcohol may be substituted by halogen atoms (particularly, fluorine atoms).

The above-mentioned halogenated hydrocarbon is more preferably a chlorinated hydrocarbon. Examples thereof include dichloromethane, chloroform and the like, and dichloromethane is more preferred. The above-mentioned esters include, for example, methyl formate, ethyl formate, propyl formate, pentyl formate, methyl acetate, ethyl acetate, pentyl acetate and the like. The above-mentioned ketones include, for example, acetone, methyl ethyl ketone diethyl ketone, diisobutyl ketone, cyclopentanone, cyclohexanone, methylcyclohexanone and the like.

The above-mentioned ethers include, for example, diethyl ether, methyl tert-butyl ether, diisopropyl ether, dimethoxymethane, dimethoxyethane, 1,4-dioxane, 1,3-dioxolane, 4-methyldioxolane, tetrahydrofuran, methyltetrahydrofuran, anisole, phenetole and the like.

The above-mentioned alcohols include, for example, methanol, ethanol, 1-propanol, 2-propanol, 1-butanol, 2-butanol, tert-butanol, 1-pentanol, 2-methyl-2-butanol, cyclohexanol, 2-fluoroethanol, 2,2,2-trifluoroethanol, 2,2,3,3-tetrafluoro-1-propanol and the like. Preferred is an alcohol having 1-4 carbon atoms, more preferred is methanol, ethanol or butanol, and most preferred is methanol or butanol. The above-mentioned hydrocarbons include, for example, n-pentane, cyclohexane, n-hexane, benzene, toluene, xylene and the like, The above-mentioned organic solvents having two or more functional groups include, for example, 2-ethoxyethyl acetate, 2-methoxyethanol, 2-butoxyethanol, methyl acetoacetate and the like.

When the polymer constituting the transparent polymer film of the invention contains a hydrogen-bonding functional group such as a hydroxyl group, an ester or a ketone, the alcohol is contained preferably in an amount of 5 to 30% by mass, more preferably in an amount of 7 to 25% by mass, and still more preferably in an amount of 10 to 20% by mass, in all solvents, from the viewpoint of a reduction in peeling load from a casting support. The polymers containing a hydrogen-bonding functional group include a cellulose acylate.

The adjustment of the alcohol content can make it easy to control the development of Re or Rth of the transparent polymer film produced by the production method of the invention. Specifically, it becomes possible to set the heat treatment temperature relatively low or to more increase the arriving range of Re or Rth by increasing the alcohol content.

Further, it is preferred that the above-mentioned polymer solution used for the preparation of the polymer film of the invention is small in the ratio of components volatilized together with the halogenated hydrocarbon in an initial stage of a drying course, and that the boiling point of the solution gradually concentrated increases to 95° C. or more. At the same time, an organic solvent as a poor solvent for the cellulose ester is contained preferably in an amount of 1 to 15% by mass, more preferably in an amount of 1.5 to 13% by mass, and still more preferably in an amount of 2 to 10% by mass. Further, in the invention, it is also effective for an increase in solution viscosity or in film strength in a wet film state at the time of drying, or an increase in dope strength at the time of casting by a drum method to allow water to be contained in small amounts. For example, water may be allowed to be contained in an amount of 0.1 to 5% by mass, more preferably in an amount of 0.1 to 3% by mass, and particularly in an amount of 0.2 to 2% by mass, based on the whole solution.

Examples of combinations of the organic solvents preferably used as the solvent of the polymer solution used for the preparation of the polymer film of the invention will be mentioned below, but the invention should not be construed as being limited thereto. Incidentally, numerical values for ratios are parts by mass.

(1) Dichloromethane/methanol/ethanol/butanol=80/10/5/5

(2) Dichloromethane/methanol/ethanol/butanol=80/5/5/10

(3) Dichloromethane/isobutyl alcohol=90/10

(4) Dichloromethane/acetone/methanol/propanol=80/5/5/10

(5) Dichloromethane/methanol/butanol/cyclohexane=80/8/10/2

(6) Dichloromethane/methyl ethyl ketone/methanol/butanol=80/10/5/5

(7) Dichloromethane/butanol=90/10

(8) Dichloromethane/acetone/methyl ethyl ketone/ethanol/butanol=68/10/10/7/5

(9) Dichloromethane/cyclopentanone/methanol/pentanol=80/2/15/3

(10) Dichloromethane/methyl acetate/ethanol/butanol=70/12/15/3

(11) Dichloromethane/methyl ethyl ketone/methanol/butanol=80/5/5/10

(12) Dichloromethane/methyl ethyl ketone/acetone/methanol/pentanol=50/20/15/15/10

(13) Dichloromethane/1,3-dioxolane/methanol/butanol=70/15/5/10

(14) Dichloromethane/dioxane/acetone/methanol/butanol=75/5/10/5/5

(15) Dichloromethane/acetone/cyclopentanone/ethanol/isobutyl alcohol/cyclohexane=60/18/3/10/7/2

(16) Dichloromethane/methyl ethyl ketone/acetone/isobutyl alcohol=70/10/10/10

(17) Dichloromethane/acetone/ethyl acetate/butanol/hexane=69/10/10/10/1

(18) Dichloromethane/methyl acetate/methanol/isobutyl alcohol=65/15/10/10

(19) Dichloromethane/cyclopentanone/ethanol/butanol=85/7/3/5

(20) Dichloromethane/methanol/butanol=83/15/2

(21) Dichloromethane=100

(22) Acetone/ethanol/butanol=80/15/5

(23) Methyl acetate/acetone/methanol/butanol=75/10/10/5

(24) 1,3-Dioxolane=100

(25) Dichloromethane/methanol/butanol/water=85/18/1.5/0.5

(26) Dichloromethane/acetone/methanol/butanol/water=87/5/5/2.5/0.5

(27) Dichloromethane/methanol=92/8

(28) Dichloromethane/methanol=90/10

(29) Dichloromethane/methanol=87/13

(30) Dichloromethane/ethanol=90/10

Further, the case where non-halogen-based organic solvents are used as the main solvents is described in detail in JIII Journal of Technical Disclosure (No. 2001-1745, published on Mar. 15, 2001, Japan Institute of Invention and Innovation), and can be appropriately used. Typical examples of these solvents will be described below.

(31) Methyl acetate/acetone/methanol/butanol=85/10/5/5

(32) Methyl acetate/methyl ethyl ketone/methanol/ethanol=80/10/5/5

(33) Methyl acetate/cyclopentanone/acetone/methanol/ethanol=60/15/15/5/5

(34) Methyl acetate/1,3-dioxolane/methanol/ethanol=70/20/5/5

(35) Acetone/cyclopentanone/ethanol/butanol=65/20/10/5

(36) Acetone/methylene chloride/methanol=85/5/5

(37) 1,3-Dioxolane/methylene chloride/methanol/butanol=70/15/10/5

(Solution Concentration)

The polymer concentration in the above-mentioned polymer solution to be prepared is preferably from 5 to 40% by mass, more preferably from 10 to 30% by mass, and most preferably from 15 to 30% by mass. The above-mentioned polymer concentration can be adjusted to a predetermined concentration at a stage in which the polymer is dissolved in the solvent. Further, after a solution having a low concentration (for example, 4 to 14% by mass) is previously prepared, it may be concentrated by evaporating the solvent, or the like. Furthermore, after a solution having a high concentration is previously prepared, it may be diluted. In addition, the polymer concentration can also be decreased by adding an additive.

(Additives)

The above-mentioned polymer solution used for the preparation of the polymer film of the invention may further contain various liquid or solid additives according to its use in respective preparation steps. Examples of the above-mentioned additives include an ultraviolet absorbent (0.001 to 1% by mass), a fine particle powder having an average particle size of 5 to 3,000 nm (0.001 to 1% by mass), a fluorine-based surfactant (0.001 to 1% by mass), a release agent (0.0001 to 1% by mass), an antidegradant (0.0001 to 1% by mass), an optical anisotropy controlling agent (0.01 to 10% by mass) and an infrared absorbent (0.001 to 1% by mass).

The above-mentioned optical anisotropy controlling agent is an organic compound having a molecular weight of 3,000 or less, and preferably, a compound having both of a hydrophobic moiety and a hydrophilic moiety. Such a compound changes the retardation value by aligning between polymer chains. Further, such a compound improves hydrophobicity of the film to be able to decrease changes in retardation with humidity.

Further, the wavelength dependency of retardation can also be effectively controlled by using the above-mentioned ultraviolet absorbent or the above-mentioned infrared absorbent together. It is preferred that all the additives used in the polymer film of the invention are not substantially volatilized in the drying course. Of the above-mentioned optical anisotropy controlling agents, an optical anisotropy controlling agent can be preferably used according to the desired optical characteristics (Re and Rth Values).

Specific examples of additives having an effect of increasing Rth include plasticizers described in JP-A-2005-104148, pages 33-34 and optical anisotropy controlling agents described in JP-A-2005-104148, pages 38-89.

(Preparation of Polymer Solution)

The above-mentioned polymer solution can be prepared, for example, according to preparation methods described in JP-A-58-127737, JP-A-61-106628, JP-A-2-276830, JP-A-4-259511, JP-A-5-163301, JP-A-9-95544, JP-A-10-45950, JP-A-10-95854, JP-A-11-71463, JP-A-11-302388, JP-A-11-322946, JP-A-11-322947, JP-A-11-323017, JP-A-2000-53784, JP-A-2000-273184 and JP-A-2000-273239. Specifically, the polymer and the solvent are mixed and stirred to perform swelling, and after heating, cooling or the like is performed in some cases to dissolve the polymer, the solution is filtered to obtain a polymer solution.

In the invention, in order to improve solubility of the polymer in the solvent, a process of cooling and/or heating a mixture of the polymer and the solvent may be contained. When the halogen-based organic solvent is used as the solvent and the cellulose acylate as the polymer, and the mixture of the polymer and the solvent is cooled, the mixture is preferably cooled to −100 to 10° C. Further, a process of performing swelling at −10 to 39° C. is preferably contained as a process prior to the cooling process, and a process of warming to 0 to 39° C. is preferably contained as a process after the cooling.

When the halogen-based organic solvent is used as the solvent, and the mixture of the cellulose acylate and the solvent is heated, it is preferred to contain a process of dissolving the cellulose acylate in the solvent by one or more methods selected from the following (a) and (b):

(a) Swelling is performed at −10 to 39° C., and the resulting mixture is warmed to 0 to 39° C.

(b) Swelling is performed at −10 to 39° C., the resulting mixture is heated to 40 to 240° C. at 0.2 to 30 MPa, and the heated mixture is cooled to 0 to 39° C.

Further, when the non-halogen-based organic solvent is used as the solvent, and the mixture of the cellulose acylate and the solvent is cooled, it is preferred to include a process of cooling the mixture to −100 to −10° C. Further, a process of performing swelling at −10 to 55° C. is preferably contained as a process prior to the cooling process, and a process of warming to 0 to 57° C. is preferably contained as a process after the cooling.

When the non-halogen-based organic solvent is used as the solvent, and the mixture of the cellulose acylate and the solvent is heated, it is preferred to contain a process of dissolving the cellulose acylate in the solvent by one or more methods selected from the following (c) and (d):

(c) Swelling is performed at −10 to 55° C., and the resulting mixture is warmed to 0 to 57° C.

(d) Swelling is performed at −10 to 55° C., the resulting mixture is heated to 40 to 240° C. at 0.2 to 30 MPa, and the heated mixture is cooled to 0 to 57° C.

[Film Formation of Polymer Film of the Invention]

The polymer film of the invention can be produced by the solution casting film forming method using the above-mentioned polymer solution. When the solution casting film forming method is performed, a conventional apparatus can be used according to a conventional method. Specifically, a dope (polymer solution) prepared in a dissolver (tank) is once stored in a storage tank after filtration to remove foams contained in the dope, thereby being able to perform final preparation. The dope is kept warm at 30° C., and sent from a dope outlet to a pressurized die, for example, through a pressurized metering gear pump which can perform quantitative solution sending with a high degree of accuracy by revolutions. The dope is uniformly cast from a nozzle (slit) of the pressurized die onto a metal support of a casting unit running endlessly (a casting process). Then, a half-dry dope film (also referred to as a web) is separated from the metal support at a separation point where the metal support has approximately gone round, and subsequently transferred to a drying zone to terminate drying while transferring with a group of rolls. Details of the casting process and the drying process of the solution casting film forming method are described also in JP-A-2005-104148, pages 120-146, and can also be appropriately applied to the invention.

Further, the polymer film of the invention can be produced by the melt casting film forming method without using the above-mentioned polymer solution. The melt casting film forming method is a method of casting on a support a melt obtained by heating the polymer, and cooling it to form a film. When the melting point of the polymer or the melting point of a mixture of the polymer and various additives is lower than the decomposition temperature thereof and higher than the stretching temperature, it is possible to employ the melt casting film forming method. The melt casting film forming method is described in JP-A-2000-352620 and the like.

When the retardation of the transparent polymer film of the invention is controlled, it is preferred that a history of mechanical behaviors on the polymer film, that is to say, external force given to the polymer web in the course of film formation, is controlled. Specifically, when the transparent polymer film produced shows a high Re, the polymer web is stretched preferably 0.1% to less than 300%, more preferably 0.5 to 200%, still more preferably 1 to 100%.

Incidentally, when the polymer film is prepared while transferring it, it is preferably stretched in the transfer direction thereof. In the case of this stretching, the residual solvent amount of the polymer web, which is calculated based on the following equation, is 5 to 1,000%. The residual solvent amount is preferably from 10 to 200%, more preferably from 30 to 150%, and still more preferably from 40 to 100%.

Residual solvent amount (% by mass)=$\{(M-N)/N\}\times 100$ wherein M represents the mass of the polymer film just before inserted into a stretching zone, and N represents the mass at the time when the polymer film just before inserted into the stretching zone is dried at 110° C. for 3 hours.

When stretching is performed in a state where the residual solvent amount is 5% or more, the haze is hard to increase. When stretching is performed in a state where the residual solvent amount is 1,000% or less, external force applied to a polymer chain is easily transmitted, so that the effect of adjusting development of retardation due to stretching of the polymer web performed in a state where the above-mentioned solvent is contained has a tendency to increase. Incidentally, the residual solvent amount in the polymer web can be appropriately adjusted by changing the concentration of the above-mentioned polymer solution, the temperature or speed of the metal support, the temperature or air volume of the drying air, the solvent gas concentration in the drying atmosphere, or the like.

The residual solvent amount in the film after termination of drying is preferably from 0 to 2% by mass, more preferably from 0 to 1% by mass, and particularly preferably from 0 to 0.5% by mass. The width of the polymer film is preferably from 0.5 to 5 m, and more preferably from 0.7 to 3 m. The length of the film wound is preferably from 300 to 30,000 m, more preferably from 500 to 10,000 m, and still more preferably from 1,000 to 7,000 m.

The moisture permeability of the polymer film of the invention formed is preferably 0.1 g/(m$^2$·day) or more, more preferably from 1 to 1,500 g/(m$^2$·day), still more preferably from 2 to 1,000 g/(m$^2$·day), and particularly preferably from 3 to 800 g/(m$^2$·day), in terms of a film thickness of 80 μm. In order to prepare the film of the invention having a moisture permeability of 100 g/(m$^2$·day) or more in terms of a film thickness of 80 μm, it is preferred to suitably control the hydrophilicity of the polymer or to decrease the density of the polymer.

The former methods include, for example, a method of suitably controlling the hydrophilicity of a main chain of the polymer, and further introducing a hydrophobic or hydrophilic side chain, and the like, and the latter methods include, for example, a method of introducing a side chain into a main chain of the polymer, a method of selecting the kind of solvent used at the time of film formation, a method of controlling the drying speed at the time of film formation, and the like.

The moisture permeability in the invention is a value evaluated from a change in mass (g/(m$^2$·day)) between before and after humidity conditioning, when a cup in which calcium chloride is placed is covered and sealed with a film to be evaluated, and allowed to stand under conditions of 40° C. and a relative humidity of 90% for 24 hours. Incidentally, the moisture permeability increases with an increase in temperature, and also increases with an increase in humidity, but independently of each condition, the magnitude correlation of the moisture permeability between the films does not change.

In the invention, therefore, the value of the above-mentioned change in mass at 40° C. and a relative humidity of 90% is taken as the standard. Further, the moisture permeability decreases with an increase in film thickness, and increases with a decrease in film thickness. Accordingly, the measured moisture permeability is first multiplied by the measured film thickness, and then, divided by 80. The value thus obtained is taken as the "moisture permeability in terms of a film thickness of 80 μm".

<Polymer Film>
(Optical Characteristics of Polymer Film of the Invention)

According to the above-mentioned production method of the invention, the transparent polymer film having controlled retardation can be obtained. Specifically, according to the production method of the invention, the transparent polymer film having well-developed retardation can be obtained.

(Retardation)

In this specification, Re and Rth (unit: nm) are determined according to the following method. First, a film is conditioned at 25° C. and a relative humidity of 60% for 24 hours, and then, using a prism coupler (Model 2010 Prism Coupler, manufactured by Metricon) and a solid laser at 532 nm at 25° C. and a relative humidity of 60%, the average refractive index (n) represented by the following equation (a) is determined.

$$n=(n_{TE}\times 2+n_{TM})/3 \qquad \text{Equation (a)}$$

wherein $n_{TE}$ is the refractive index measured with polarizing light in a plane direction of the film, and $n_{TM}$ is the refractive index measured with polarizing light in a normal direction to a surface of the film.

In this specification, Re (λ) and Rth (λ) (unit: nm) indicate the in-plane retardation and the retardation in a thickness direction, respectively, at a wavelength of λ. Re (λ) is measured by allowing light having a wavelength of λ nm to be incident on the film in a normal direction thereof, using KOBRA 21ADH or WR (manufactured by Oji Scientific Instruments).

When the film to be measured is one represented by a monoaxial or biaxial index ellipsoid, Rth (λ) is calculated according to the following method.

The above-mentioned Re (λ) is measured by allowing light having a wavelength of λ nm to be incident on the film from respective inclination directions relative to the normal direction of the film, at intervals of 10 degrees between −50 and +50 degrees from the normal direction, taking an in-plane slow axis (judged by KOBRA 21ADH or WR) as an inclination axis (rotation axis) (when the film has no slow axis, any in-plane direction of the film is taken as the rotation axis), thereby obtaining 11 measurements in total. Based on the retardation values thus measured, the average refractive index and the film thickness value entered, Rth (X) is calculated by KOBRA 2IADH or WR.

In the above, when there is no description with regard to λ and only Re and Rth are described, they indicate values measured by using light having a wavelength of 590 nm. Further, when the film has a direction in which the retardation becomes zero at a certain inclination angle, taking the in-plane slow axis as the rotation angle from the normal direction, the retardation value at an inclination angle larger than that inclination angle is changed to a negative one, and then, calculation is performed by KOBRA 2IADH or WR. Incidentally, taking the slow axis as the inclination axis (rotation axis) (when the film has no slow axis, any in-plane direction of the film is taken as the rotation axis), it is also possible to measure the retardation values from any tow inclined directions and to calculate Rth from the following equations (b) and (c), based on the retardation values thus measured, the average refractive index and the film thickness value entered.

$$Re(\theta) = \left[ nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)}$$

Equation (b)

wherein Re (θ) represents a retardation value in a direction inclined by an angle of θ from the normal direction, nx represents a refractive index in a slow axis direction in a plane, ny represents a refractive index in a direction perpendicular to nx in a plane, nz represents a refractive index in a direction perpendicular to nx and ny, and d represents the thickness of the film.

$$Rth=((nx+ny)/2-nz) \times d$$

Equation (c)

When the film to be measured can not be expressed by the monoaxial or biaxial index ellipsoid, that is to say, when the film has no optical axis, Rth (λ) is calculated by the following method:

The above-mentioned Re (λ) is measured by allowing light having a wavelength of λ nm to be incident on the film from respective inclination directions relative to the normal direction of the film, at intervals of 10 degrees between −50 and +50 degrees, taking the in-plane slow axis (judged by KOBRA 21ADH or WR) as the inclination axis (rotation axis), thereby obtaining 11 measurements in total. Based on the retardation values thus measured, the average refractive index and the film thickness value entered, Rth (λ) is calculated by KOBRA 2IADH or WR.

KOBRA 21ADH or WR calculates nx, ny and nz by entering these average refractive index and film thickness. Nz=(nx−nz)/(nx−ny) is further calculated from nx, ny and nz thus calculated.

In the invention, the retardation values Re (H %) in the in-plane direction and Rth (H %) in the thickness direction at the time when the relative humidity is H (unit: %) are obtained by conditioning the film at 25° C. and a humidity of H % for 24 hours, and then, measuring and calculating the retardation values at the time when the wavelength at a relative humidity of H % is 590 nm, in the same manner as the above-mentioned method, at 25° C. and a humidity of H %.

(Humidity Dependency)

When the humidity of the polymer film of the invention is changed, it is preferred that the retardation values meet the following relational expressions:

|Re(10%)−Re(85%)|<10 and

|Rth(10%)−Rth(85%)|<40

Further, it is more preferred that the retardation values meet the following relational expressions:

|Re(10%)−Re(85%)|<8 and

|Rth(10%)−Rth(85%)|<35

Furthermore, it is still more preferred that the retardation values meet the following relational expressions:

|Re(10%)−Re(85%)|<5 and

|Rth(10%)−Rth(85%)|<35

(Slow Axis)

In the polymer film of the invention, the angle θ between a production transfer direction and the slow axis of Re of the film is preferably 0±10° or 90±10°, more preferably 0±5° or 90±5°, and still more preferably 0±3° or 90±3°. In some cases, it is preferably 0±10 or 90±1°, and most preferably 90±1°.

(Film Thickness)

The thickness of the polymer film of the invention is preferably from 20 to 180 μm, more preferably from 30 to 160 μm, and still more preferably from 40 μm to 120 μm. A film thickness of 20 μm or more is preferred in terms of handling properties in processing the polymer film to polarizing plates or the like and inhibition of curling of the polarizing plates. The thickness unevenness of the polymer film of the invention is preferably from 0% to 2%, more preferably from 0% to 1.5%, and particularly preferably from 0 to 1%, in both transfer and width directions.

(Constitution of Polymer Film)

The polymer film of the invention may have a monolayer structure or may be constituted by a plurality of layers. However, it is preferred to have the monolayer structure. The term "monolayer structure" as used herein means one sheet of polymer film, not a plurality of film materials laminated, and also includes the case where one sheet of polymer film is produced from a plurality of polymer solutions using a sequential casting system or a co-casting system.

In this case, a polymer film having a distribution in the thickness direction thereof can be obtained by appropriately adjusting the kind of additive and the amount thereof incorporated, the molecular weight distribution of polymer and the kind thereof, and the like. Further, the monolayer structure includes one having various functional portions such as an optically anisotropic portion, an antiglare portion, a gas barrier portion and a moisture-resistant portion in the one sheet of film.

(Surface Treatment)

The polymer film of the invention is appropriately surface-treated, whereby it becomes possible to improve adhesiveness to various functional layers (for example, an undercoat layer, a back layer and an optically anisotropic layer). The above-mentioned surface treatment includes glow discharge treatment, UV irradiation treatment, corona treatment, flame treatment and saponification treatment (acid saponification treatment and alkali saponification treatment). In particular, glow discharge treatment and alkali saponification treatment are preferred.

The term "glow discharge treatment" as used herein is treatment in which plasma treatment is performed on a film surface in the presence of a plasma-exciting gas. The details of these surface treatment methods are described in JIII Journal of Technical Disclosure (No. 2001-1745, published on Mar. 15, 2001, Japan Institute of Invention and Innovation), and can be appropriately used.

In order to improve adhesiveness between the film surface and the functional layer, an undercoat layer (adhesive layer) can also be formed on the transparent polymer film of the invention in addition to or in place of the surface treatment. The above-mentioned undercoat layers are described in JIII Journal of Technical Disclosure (No. 2001-1745, published on Mar. 15, 2001, Japan Institute of Invention and Innovation), page 32, and these can be appropriately used. Further, functional layers formed on a cellulose acylate film are described in JIII Journal of Technical Disclosure (No. 2001-1745, published on Mar. 15, 2001, Japan Institute of Invention and Innovation), pages 32-45, and ones described therein can be appropriately used on the transparent polymer film of the invention.

<Phase Difference Film>

The polymer film of the invention can be used as a phase difference film. Incidentally, the term "phase difference film" means an optical material which is generally used in display devices such as liquid crystal display devices and has optical anisotropy, and it has the same meaning as a phase difference plate, an optical compensatory film, optical compensatory sheet and the like. In the liquid crystal display devices, the phase difference film is used for the purposes of increasing the contrast of a display screen and improving the viewing angle characteristics and coloration thereof.

Use of the transparent polymer film of the invention makes it possible to easily prepare a phase difference film in which the Re value and the Rth value are freely controlled.

Further, the plurality of polymer films of the invention may be laminated, or the polymer film of the invention may be laminated to a film other than that of the invention to appropriately adjust Re or Rth. The laminated film can be used as the phase difference film. The lamination of the films can be performed using a pressure sensitive adhesive or an adhesive.

Further, in some cases, the polymer film of the invention may be used as a support for a phase difference film, and an optically anisotropic layer comprising liquid crystals may be provided thereon. The resulting film can be used as the phase difference film. The optically anisotropic layer applied to the phase difference film of the invention may be formed of, for example, a composition containing a liquid crystalline compound, a polymer film having birefringence or the polymer film of the invention.

The above-mentioned liquid crystalline compound is preferably a discotic liquid crystalline compound or a rod-shaped liquid crystalline compound.

[Discotic Liquid Crystalline Compound]

Examples of the discotic liquid crystalline compounds which can be used as the above-mentioned liquid crystalline compounds in the invention include compounds described in various documents (for example, C. Destrade et al., *Mol. Crysr. Liq. Cryst.*, Vol. 71, page 111 (1981); edited by the Chemical Society of Japan, Quarterly Issued, Review of Chemistry, No. 22, Chemistry of Liquid Crystal, Chap. 5, Chap. 10, Sec. 2 (1994); B. Kohne et al., *Angew. Chem. Soc. Chem. Comm.*, page 1794 (1985); J. Zhang et al., *J. Am. Chem. Soc.*, Vol. 116, page 2655 (1994)).

In the above-mentioned optically anisotropic layer, a discotic liquid crystalline molecule is preferably fixed in an aligned state, and most preferably fixed by polymerization reaction. Further, polymerization of the discotic liquid crystalline molecules is described in JP-A-8-27284. In order to fix the discotic liquid crystalline molecule by polymerization, it is necessary to bond a polymerizable group as a substituent group to a disc core of the discotic liquid crystalline molecule. However, when the polymerizable group is directly bonded to the disc core, it becomes difficult to keep the aligned state in the polymerization reaction. Accordingly, a linking group is introduced between the disc core and the polymerizable group. The discotic liquid crystalline molecule having a polymerizing group is disclosed in JP-A-2001-4387.

[Rod-Shaped Liquid Crystalline Compound]

Examples of the rod-shaped liquid crystalline compounds which can be used as the above-mentioned liquid crystalline compounds in the invention include azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolans and alkenylcyclohexylbenzonitriles. Further, not only the low-molecular rod-shaped liquid crystalline compounds as described above, but also high-molecular rod-shaped liquid crystal compounds can be used.

In the above-mentioned optically anisotropic layer, a rod-shaped liquid crystalline molecule is preferably fixed in an aligned state, and most preferably fixed by polymerization reaction. Examples of the polymerizable rod-shaped liquid crystalline compounds which can be used in the invention include, for example, compounds described in *Makromol. Chem.*, Vol. 190, page 2255 (1989), *Advanced Materials*, Vol. 5, page 107 (1993); U.S. Pat. Nos. 4,683,327, 5,622,648 and 5,770,107, PCT International Publications WO95/22586 pamphlet, WO95/24455 pamphlet, WO97/00600 pamphlet, WO98/23580 pamphlet and WO98/52905 pamphlet, JP-A-1-272551, JP-A-6-16616, JP-A-7-110469, JP-A-11-80081, JP-A-2001-328973 and the like.

<Polarizing Plate>

The polymer film of the invention can be used as a protective film for a polarizing plate (the polarizing late of the invention). The polarizing plate of the invention comprises a polarizing film and two polarizing plate protective films (transparent polymer films) for protecting both surfaces of the film, and the polymer film or phase difference film of the invention can be used as at least one of the polarizing plate protective films.

When the polymer film of the invention is used as the above-mentioned polarizing plate protective film, it is preferred that the above-mentioned surface treatment (also described in JP-A-6-94915 and JP-A-6-118232) is performed on the polymer film of the invention to hydrophilize it. For example, glow discharge treatment, corona discharge treatment or alkali saponification treatment is preferably performed. In particular, when the polymer constituting the polymer film of the invention is a cellulose acylate, alkali saponification treatment is most preferably used as the above-mentioned surface treatment.

Further, as the above-mentioned polarizing film, there can be used, for example, a polyvinyl alcohol film immersed and stretched in an iodine solution, or the like. When the polarizing film obtained by immersing and stretching the polyvinyl alcohol film in the iodine solution is used, the treated surface of the polymer film of the invention can be directly laminated to each of both surfaces of the polarizing film using an adhesive. In the production method of the invention, it is preferred that the above-mentioned polymer film is directly laminated to the polarizing film as described above. As the above-mentioned adhesive, there can be used an aqueous solution of polyvinyl alcohol or a polyvinyl acetal (for example, polyvinyl butyral) or a latex of a vinyl polymer (e.g., polybutyl acrylate). The adhesive is particularly preferably an aqueous solution of completely saponified polyvinyl alcohol.

In general, a liquid crystal display device is provided with a liquid crystal cell between two polarizing plates, so that the device has four polarizing plate protective films. The transparent polymer film of the invention may be used as any one of the four polarizing plate protective films. However, the transparent polymer film of the invention can be particularly preferably used as the protective film disposed between the polarizing film and the liquid crystal layer (liquid crystal cell) in the liquid crystal display device. Further, a transparent hard coat layer, an antiglare layer, an antireflection layer or the like can be provided on the protective film disposed on the opposite side to the transparent polymer film of the invention with the above-mentioned polarizing film therebetween. In particular, the film of the invention is preferably used as the polarizing plate protective film on the outermost side of a display side of the liquid crystal display device.

<Liquid Crystal Display Device>

The polymer film, the phase difference film and the polarizing plate of the invention can be used in liquid crystal display devices of various display modes. Respective liquid crystal modes in which these films are used will be described below. Of those modes, the transparent polymer film, the retardation film and the polarizing plate of the invention are preferably used in liquid crystal display devices of VA mode and IPS mode. These liquid crystal display devices may be of any one of a transmission type, a reflection type and a semi-transmission type.

(TN-Type Liquid Crystal Display Device)

The polymer film of the invention may be used as a support for the phase difference film in a TN-type liquid crystal display device having a TN-mode liquid crystal cell. The TN-mode liquid crystal cell and the TN-type liquid crystal display device have been well known from old times. The phase difference films used in the TN-type liquid crystal display device are described in reports of Mori et al. (*Jpn. J. Appl. Phys.*, Vol. 36, page 143 (1997), and *Jpn. J. Appl. Phys.*, Vol. 36, page 1068 (1997)), as well as in JP-A-3-9325, JP-A-6-148429, JP-A-8-50206 and JP-A-9-26572.

(STN-Type Liquid Crystal Display Device)

The polymer film of the invention may be used as a support for the phase difference film in an STN-type liquid crystal display device having an STN-mode liquid crystal cell. In general, in the STN-type liquid crystal display device, the rod-shaped liquid crystalline molecule in the liquid crystal cell is twisted within the range of 90 to 360 degrees, and the product (Δnd) of the refractive anisotropy (Δn) of the rod-shaped liquid crystalline molecule and the cell gap (d) is within the range of 300 to 1500 nm. The phase difference films used in the STN-type liquid crystal display device are described in JP-A-2000-105316.

(VA-Type Liquid Crystal Display Device)

The polymer film of the invention is particularly advantageously used as the phase difference film or as a support for the phase difference film in a VA-type liquid crystal display device having a VA-mode liquid crystal cell. The VA-type liquid crystal display device may be of a multi-domain system, for example, as described in JP-A-10-123576. In these embodiments, the polarizing plate in which the polymer film of the invention is used contributes to enlargement of the viewing angle and improvement of the contrast.

(IPS-Type Liquid Crystal Display Device and ECB-Type Liquid Crystal Display Device)

The polymer film of the invention is particularly advantageously used as the phase difference film, a support for the phase difference film or a protective film for the polarizing plate in an IPS-type liquid crystal display device having an ISP-mode liquid crystal cell and an ECB-type liquid crystal display device having an ECB-mode liquid crystal cell. These modes are embodiments in which liquid crystal materials are aligned nearly in parallel when black is displayed, and the liquid crystal molecules are aligned in parallel to a substrate face with no voltage applied thereto, thereby displaying black. In these embodiments, the polarizing plate in which the polymer film of the invention is used contributes to enlargement of the viewing angle and improvement of the contrast.

(OCB-Type Liquid Crystal Display Device and HAN-Type Liquid Crystal Display Device)

The polymer film of the invention is also particularly advantageously used as a support for the phase difference film in an OCB-type liquid crystal display device having an OCB-mode liquid crystal cell or a HAN-type liquid crystal display device having a HAN-mode liquid crystal cell. In the phase difference film used in the OCB-type liquid crystal display device or the HAN-type liquid crystal display device, it is preferred that the direction in which the absolute value of the retardation becomes minimum does not exist both in a plane of the phase difference film and in a normal direction thereof. Optical properties of the phase difference film used in the OCB-type liquid crystal display device and the HAN-type liquid crystal display device are also determined by optical properties of the optically anisotropic layer, optical properties of the support and arrangement of the optically anisotropic layer and the support. The phase difference films used in the OCB-type liquid crystal display device or the HAN-type liquid crystal display device are described in JP-A-9-197397. Further, they are also described in a report of Mori et al. (*Jpn. J Appl. Phys.*, Vol. 38, page 2837 (1999)).

(Reflection-Type Liquid Crystal Display Device)

The polymer film of the invention is also advantageously used as the phase difference film in TN-mode, STN-mode, HAN-mode and GH (guest-host)-mode reflection-type liquid crystal display devices. These display modes have been well known from old times. The TN-mode reflection-type liquid crystal display devices are described in JP-A-10-123478, PCT International Publication WO98/48320 pamphlet and Japanese Patent No. 3022477. The phase difference films used in the reflection-type liquid crystal display device is described in PCT International Publication WO00/65384 pamphlet.

(Other Liquid Crystal Display Devices)

The polymer film of the invention is also advantageously used as a support for the phase difference film in an ASM (axially symmetric aligned microcell)-type liquid crystal display device having an ASM-mode liquid crystal cell. The ASM-mode liquid crystal cell is characterized in that the cell thickness is maintained by a position-adjustable resin spacer. The other properties thereof are the same as those of the TN-mode liquid crystal cell. The ASM-mode liquid crystal cell and the ASM-type liquid crystal display device are described in a report of Kume et al. (Kume et al., *SID 98 Digest* 1089 (1988)).

(Hard Coat Film, Antiglare Film, Antireflection Film)

The polymer film of the invention may be applied to a hard coat film, an antiglare film and an antireflection film in some cases. For the purpose of improving the visibility of flat panel displays such as LCD, PDP, CRT and EL, any one or all of a hard coat layer, an antiglare layer and an antireflection layer can be given to one or both surfaces of the transparent polymer film of the invention. Preferred embodiments of such antiglare films and antireflection films are described in detail JIII Journal of Technical Disclosure (No. 2001-1745, published on Mar. 15, 2001, Japan Institute of Invention and Innovation), pages 54-57, and can be preferably employed also in the transparent polymer film of the invention.

EXAMPLES

The characteristics of the invention will be more specifically explained with reference to the following examples and comparative examples. The materials, the amounts used, the ratios, the processing contents, the processing procedures and the like shown in the following examples can be appropriately changed without departing from the spirit of the invention. Accordingly, the scope of the invention should not be construed as being limited by specific examples shown below.

<Measurement Methods>

First, measurement methods and evaluation methods of characteristics used in the examples will be shown below:

[Degree of Substitution]

The degree of acyl substitution of a cellulose acylate is determined by $^{13}$C-NMR according to a method described in Tezuka et al., *Carbohydr. Res.* 273, 83-91 (1995).

(Weight Average Molecular Weight and Number Average Molecular Weight)

A resin sample is dissolved in THF to prepare a 0.5% by mass sample solution, and the weight average molecular weight and the number average molecular weight are measured under the following conditions using GPC. Incidentally, a calibration curve is prepared using polystyrene (TSK standard polystyrene, molecular weight: 1,050, 5,970, 18,100, 37, 900, 190,000, 706,000). As columns, there are used TSK GEL Super HZ4000, TSK GEL Super HZ2000, TSK GEL Super HZM-M and TSK Guard Column Super HZ-L. Measurement is made at a column temperature of 40° C., using THF as an eluent, at a low rate of 1 ml/min and using a refractive index meter (RI) as a detector.

(Sulfate Radical Content)

The sulfate radical content in a sample is measured according to ASTM D-817-96, and the amount thereof is indicated by the sulfur atom content.

(Alkali Metal Content and Group II Metal Content)

Nitric acid is added to a sample to perform multiwave ashing, and then, the sample is dissolved in water. The amounts of metals contained is measured by the ICP-OES method.

[Retardation]

Samples of 2 cm square in size are taken out at 5 positions in a width direction (a center position, both edge positions (each is at a positions of 5% of the entire width from each of both edges) and 2 intermediate positions between the central position and the both edge positions) for every 100 m in a longitudinal direction, and retardation values at the respective positions evaluated according to the above-mentioned method are averaged to obtain Re, Rth, Re (10%), Re (85%), Rth (10%) and Rth (85%). Then, ΔRe and ΔRth are calculated, and further, ΔRe/Re and ΔRth/Rth are calculated, from the following equations (VIII) and (IX):

$$\Delta Re = |Re(10\%) - Re(85\%)| \quad \text{Equation (VIII)}$$

$$\Delta Rth = |Rth(10\%) - Rth(85\%)| \quad \text{Equation (IX)}$$

[Slow Axis Variation]

The difference between the maximum value and the minimum value of deviations (unit: degree, it can take a value of −45° to +45°) of directions of the slow axes of respective samples taken out in the same manner as in the above-mentioned retardation, measurement from the transfer direction or a direction perpendicular thereto is taken as the slow axis variation.

[Glass Transition Temperature (Tg)]

Twenty milligrams of a polymer film before heat treatment is placed in a DSC measurement pan, and the temperature of this is raised from 30° C. to 120° C. in a nitrogen gas stream at 10° C./min. After kept for 15 minutes, this is cooled to 30° C. at −20° C./min. Thereafter, the temperature of this is raised again from 30° C. to 250° C., and the temperature at which a base line begins to deviate from the low-temperature side is taken as Tg of the polymer film before heat treatment.

[Polymerization Degree]

After s cellulose acylate produced is absolutely dried, about 0.2 g thereof is precisely weighed and dissolved in 100 mL of a mixed solvent of dichloromethane and ethanol (9:1 (mass ratio)). The drop seconds thereof are counted at 25° C. with an Ostwald viscosimeter, and the polymerization degree DP is determined by the following equations:

$$\eta_{rel} = T/T_0$$

$$[\eta] = \ln(\eta_{rel})/C$$

$$DP = [\eta]/Km$$

wherein T is drop seconds of a measurement sample, $T_0$ is drop seconds of a solvent alone, ln is natural logarithm, C is a concentration (g/L), and Km is $6 \times 10^{-4}$.

(Polarization Degree)

The transmittance (Tp) in the case where two polarizing plates produced are laminated with their absorption axes kept in parallel to each other and the transmittance (Tc) in the case where they are laminated with their absorption axes kept perpendicular to each other are measured. The polarization degree (P) is calculated according to the following equation:

$$\text{Polarization degree } P = ((Tp - Tc)/(Tp + Tc))^{0.5}$$

[Surface State of Film]

A surface of a transparent polymer film is visually observed, and evaluated according to the following measures for evaluation:

A: The surface state of the film is good, and preferably applicable as an optical film.

B: Some undulations are observed on the film, but it is preferably applicable as an optical film.

C: Undulations occur over a considerable area of the film, or the film partially becomes clouded, so that it is inapplicable as an optical film.

D: Significant undulations occur on the film, or the whole surface thereof becomes clouded, do that it is inapplicable as an optical film.

Samples are taken at 5 positions in a width direction of a film (a center position, both edge positions (each is at a positions of 5% of the entire width from each of both edges) and 2 intermediate positions between the central position and the both edge positions), and the average value is calculated from values of the samples taken at the respective positions, which are evaluated according to JIS-K7136, thereby determining the haze value.

Example 1

Preparation and Evaluation of Transparent Polymer Film

1) Preparation of Polymer Solution
(1-1) Polymer and Additives

In the production of each film, a cellulose ester described in Table 1 is used as a polymer. Each polymer is heated and dried at 110° C. to decrease the moisture content to 0.5% by mass or less. Then, using 20 parts by mass thereof, fine silicon dioxide particles (particle size: 20 nm, Mohs hardness: about 7) (0.08 part by mass) are further added thereto. Further, in each film, a plasticizer described in Table 1 is added in an amount (% by mass based on polymer) described in Table 1.

(1-2) Solvent

In the production of each film, a mixed solvent of dichloromethane/methanol/butanol (83/15/2 parts by mass) is used. Incidentally, the moisture content of all the solvents is 0.2% by mass.

(1-3) Preparation of Polymer Solution (Hereinafter Also Referred To As a Dope)

The above-mentioned plurality of solvents are mixed in a 4,000-liter stainless steel solution tank equipped with a stirring blade to prepare the mixed solvent, and various additives (described later) are added thereto. Polymer A (cellulose triacetate A) described later is gradually added thereto with thorough stirring and dispersing to adjust the total amount to 2,000 kg. Incidentally, as the solvents, there are used ones all having a moisture content of 0.5% by mass or less. A dispersion tank is charged with a powder of the polymer, and a dissolver type eccentric stirring shaft is driven for rotation at a peripheral speed of 5 m/sec (shear stress: $5 \times 10^4$ kgf/m/sec$^2$) to perform dispersion for 30 minutes with stirring by a shaft having an anchor blade on a central axis at a peripheral speed of 1 m/sec (shear stress: $1 \times 10^4$ kgf/m/sec$^2$). The initiation temperature of dispersion is 20° C., and the final attained temperature is 35° C. After the termination of dispersion, high-speed stirring is stopped, and the peripheral speed of the anchor blade is decreased to 0.5 m/sec, followed by further stirring for 100 minutes to swell polymer flakes. The inside of the tank is pressurized with a nitrogen gas to 0.12 MPa until the termination of swelling. The oxygen concentration in the tank in this case is less than 2% by volume, and a state having no problem in terms of explosion protection is kept. Further, it is confirmed that the moisture content in the dope is 0.5% by mass or less (0.3% by mass).

Polymer A (cellulose triacetate A (cellulose ester A)):

Polymer A is a powder having a substitution degree of 2.85, a viscosity-average polymerization degree of 305, a moisture content of 0.15% by mass, a 6% by mass viscosity in a methylene chloride solution of 295 mPa·s, an average particle size of 1.5 mm and a standard deviation thereof of 0.5 mm. The residual acetic acid amount is 0.01% by mass or less, the Ca content is 0.001% by mass, the Mg content is 0.004% by mass, the K content is 2 ppm, the Na content is 1 ppm, the Fe content is 0.5 ppm and the sulfur (present as sulfuric acid groups) content is 22 ppm. Further, the number average molecular weight (Mn) is 91,000, the weight average molecular weight (Mw) is 273,000, and Mw/Mn is 3.1. Further, the 6-position acetyl group is 0.95, which is 33.3% of all acetyl groups. Further, the acetone extract is 8% by mass, the ratio of the weight average molecular weight and the number average molecular weight thereof is 3.2, and the distribution thereof is uniform. Furthermore, a 80 µm-thick film prepared by using dichloromethane/methanol (90/10 parts by mass) has a yellowness index of 0.3, a haze of 0.08, a transparency of 93.5%, a Tg of 163° C. and a crystallization exothermic amount of 6.8 J/g. It also has physical properties such as a repose angle of 35 degrees, a bulk density of 0.55 g/cm$^3$, a tap density of 0.63 g/cm$^3$ and a degree of compaction of 13%. In addition, cellulose ester A is dissolved in each of mixed solvents of methylene chloride/methanol (92/8 and 80/20 by mass ratio) at room temperature (25° C.), and 20 kg of each resulting solution is allowed to pass through a cellulose ester filter having an average pore size of 10 µm, a diameter of 10 cm and a thickness of 1 mm. Then, the filter was thoroughly washed with each solvent, and an increase in mass of a SUS filter is measured. As a result, the mass increasing rate thereof is 0.05% in the case of methylene chloride/methanol (92/8 by mass ratio), and 0.09% in the case of methylene chloride/methanol (80/20 by mass ratio). The above-mentioned physical properties as used herein are evaluated as follows: The repose angle is determined by measuring an angle between an oblique side of a cone formed by pouring onto a circular disk having a diameter of 8 cm through a funnel and a horizontal. For the bulk density, the bulk density (A) before tapping is measured at a cylinder volume of 100 cm$^3$ by using Tapdenser KYT-4000 manufactured by Seishin Enterprise Co., Ltd. Further, for the tap density, the bulk density (P) at the time when the stroke is 10 mm and the number of taps is 200 is measured at a cylinder volume of 100 cm$^3$ by using Tapdenser KYT-4000 manufactured by Seishin Enterprise Co., Ltd. Furthermore, the degree of compaction (unit: %) is calculated by $(P-A)/P \times 100$ from the values of the bulk densities A and P obtained above. The addition amount of the polymer A: 20 parts by mass (% by mass based on the solvent)

(Incidentally, cellulose esters B to E will be described later).

(Additives)

Plasticizer:

The content (% by mass based on the cellulose ester) thereof is described in Table 1. Incidentally, the high molecular weight plasticizer of the invention used herein contains a component having a molecular weight of 500 or less in an amount of 10% by mass or less.

UV absorbent a:

2,4-Bis(n-octylthio)-6-(4-hydroxy3,5-di-tert-butylanilino)-1,3,5-triazine, 0.4 part by mass (% by mass based on the cellulose ester)

UV absorbent b:

Adekastab LA-31 (a product of Adeka Corporation), 0.4 part by mass (% by mass based on the cellulose ester)

UV absorbent c:

2(2'-hydroxy-3',5'-di-teret-amylphenyl)-5-chlorobenzotriazole, 0.4 part by mass (% by mass based on the cellulose ester)

$C_{12}H_{25}OCH_2CH_2O—P(=O)—(OK)_2$ (a release agent):

0.02 part by mass (% by mass based on the cellulose ester)

A mixture of monoethyl citrate and diethyl citrate:

(a release agent), 0.02 part by mass (% by mass based on the cellulose ester)

Fine Particles:

silicon dioxide (particle size: 20 nm, Mohs hardness: about 7), 0.05 part by mass (% by mass based on the cellulose ester)

(1-4) Dissolution-Filtration Process

The swelled polymer solution is heated up to 50° C. with jacketed piping from the tank, and further heated up to 90° C. under an increased pressure of 1.2 MPa to completely dissolve the polymer. The heating time is 15 minutes. Then, the temperature of the solution is lowered to 36° C., and the solution is allowed to pass through a filter having a nominal pore size of 8 µm to obtain a dope. In this case, the primary pressure of filtration is 1.3 MPa, and the secondary pressure is 1.0 MPa. As the filter, housing and piping exposed to high temperature, there are utilized ones made of a Hastelloy (registered trade mark) alloy and excellent in corrosion resistance, and used ones having a jacket through which a heat medium for thermal insulation and heating is allowed to pass.

(1-5) Condensation and Filtration

The dope before condensation thus obtained is flushed in a normal-pressure tank at 80° C., and an evaporated solvent is collected and separated by a condenser. The solid concentration of the dope after flush is 24.8% by mass. Incidentally, the collected solvent is sent to a recovery process so as to be reused as the solvent in the preparation process (the recovery is carried out by a distillation process and a dehydration process). In the flush tank, the dope is stirred by rotating a shaft having an anchor blade on a central axis at a peripheral speed of 0.5 m/sec to perform defoaming. The temperature of the dope in the tank is 25° C., and the average retention time thereof in the tank is 50 minutes.

Then, a weak ultrasonic wave is irradiated to the dope, thereby performing air vent. Thereafter, in a state pressurized to 1.3 MPa, the dope is first allowed to pass through a sintered fiber metal filter having a nominal pore size of 10 μm, and then, allowed to pass through the same 10-μm sintered fiber fitter. The primary pressure of the respective filters is 1.4 MPa and 1.1 MPa, respectively, and the secondary pressure thereof is 1.0 MPa and 0.7 MPa, respectively. The dope temperature after filtration is adjusted to 36° C., and the dope is stored in a 2,000-liter stainless steel stock tank. In the stock tank, the dope is stirred by always rotating a shaft having an anchor blade on a central axis at a peripheral speed of 0.3 m/sec. Incidentally, when the dope is prepared from the dope before condensation, no problems such as corrosion occur at all at dope-contact portions.

2) Preparation of Film (2-1) Casting Process

Subsequently, the dope in the stock tank is sent by a primary booster gear pump while performing a feedback control by an inverter motor so that the primary side pressure of a high-accuracy gear pump becomes 0.8 MPa. As for performance of the high-accuracy gear pump, the volume efficiency is 99.3%, and the coefficient of fluctuation in discharge rate is 0.4% or less. Further, the discharge pressure is 1.4 MPa.

As a casting die, there is used an apparatus which is equipped with a feed block having a width of 1.6 m and adjusted for co-casting to be able to form a film of a three-layer structure by laminating layers on both surfaces of a main stream layer. In the following explanation, the layer formed from the main stream is referred to as an intermediate layer, the layer formed on the surface on the support side is referred to as a support layer, and the layer on the opposite side is referred to as an air layer. As flow paths for dopes, there are used three flow paths for the intermediate layer, the support layer and the air layer. Incidentally, in the production of this film, only the flow path for the intermediate layer is utilized.

Then, the flow rate of the polymer dope at a discharge opening of the die is adjusted so that the film thickness of a completed polymer film becomes 80 μm, and casting is performed. In order to adjust the temperature of the dope to 36° C., the casting die is equipped with a jacket, and the inlet temperature of a heat transfer medium supplied into the jacket is set to 36° C. The die, the feed block and the piping are all maintained at 36° C. during the working process. The die used herein is a coat hunger type die, which is provided with thickness adjusting bolts at a 20 mm pitch and has an automatic thickness adjusting mechanism using a heat bolt. This heat bolt can also set a profile depending on the amount of solution to be sent through a high-accuracy gear pump by a predetermined program, and can also make a feedback control by an adjustment program based on a profile of an infrared thickness gauge installed in the film forming process. The adjustment is made in such a manner that in the film excluding 20 mm of a cast edge portion, the difference in thickness between two arbitrary points 50 mm apart is 1 μm or less and the largest difference at the minimum value thickness in the width direction becomes 2 μm/m or less. Further, a chamber for reducing pressure is installed on the primary side of the die. The degree of pressure reduction of this pressure reducing chamber is adjusted so that a pressure difference of 1 Pa to 5,000 Pa can be applied between before and after a casting bead, and it is possible to adjust according to the casting speed. In that case, the pressure difference is set so that the length of the casting bead becomes 2 mm to 50 mm.

(2-2) Casting Die

A material for the die used herein is a two-phase stainless steel having a mixed composition of an austenite phase and a ferrite phase, and has a thermal expansion coefficient of $2 \times 10^{-5}$ (° C.$^{-1}$). The material has corrosion resistance approximately equivalent to that of SUS 316 when evaluated by a forced corrosion test in an electrolytic aqueous solution. For the finished precision of liquid contact surfaces of the casting die and the feed block, the surface roughness is 1 μm or less, and the straightness is 1 μm/m or less in all directions. The clearance of a slit is adjustable to 0.5 to 3.5 mm by automatic adjustment. In the production of this film, the clearance is 1.5 mm. With respect to a corner portion of a liquid contact portion of a leading end of a die lip, processing is made so that R becomes 50 μm or less over the entire width of the slit. The shearing speed in the die is within the range of 1 (sec$^{-1}$) to 5,000 (sec$^{-1}$).

Further, the leading end of the lip of the casting die is provided with a hardened film. Examples thereof include tungsten carbide (WC), $Al_2O_3$, TiN, $Cr_2O_3$ and the like, mid particularly preferred is WC. In the invention, one on which a WC coating is formed by a flame spraying method. Further, a mixed solvent (dichloro-methane/methanol/butanol (83/15/2 parts by mass) which is a solvent for solubilizing the dope is supplied to air-liquid interfaces of the bead end and the slit at 0.5 ml/min on one side. Furthermore, in order to make the temperature of the pressure reducing chamber constant, a jacket is attached thereto, and a heat transfer medium adjusted to 35° C. is supplied. The edge suction air capacity is adjustable within the range of 1 L/min to 100 L/min, and in the production of this film, it is appropriately adjusted with in the range of 30 L/min to 40 L/min.

(2-3) Metal Support

As the support, a stainless steel endless band having a length of 100 m is used. The thickness of the band is 1.5 mm, and the band is polished to a surface roughness 0.05 μm or less. A material thereof is SUS 316, and has sufficient corrosion resistance and strength. The entire thickness unevenness of the band is 0.5% or less. The band is driven by two drums. In that case, the tension of the band is adjusted to $1.5 \times 10^4$ kg/m, and the relative difference in speed between the band and the drums is 0.01 m/min or less. Further, meandering in a width direction for one rotation is controlled by detecting both end positions of the band so as to be limited to 1.5 mm or less. Furthermore, positional fluctuations of a surface of the support in a vertical direction directly under the casting die, which are caused by rotation of the drums, is adjusted to 200 μm or less. The support is installed in a casing having a wind pressure vibration inhibiting unit. The dope is casted from the die onto this support. The surface temperature of a central portion of the support just before casting is 15° C. The temperature difference between both sides thereof is 6° C. or less. The metal support should not have surface defects, and there is used a support having no pinholes of 30 μm or more in size, one or less pinhole of 10 μm to 30 μm in size per m² and 2 or less pinholes of less than 10 μm in size per m².

(2-4) Casting Drying

The temperature of the casting chamber in which the above-mentioned casing die and support and the like are installed is kept at 35° C. The dope casted on the band is first dried by supplying a parallel flow of a drying air. The overall heat transfer coefficient from the drying air to the dope in drying is 24 kcal/m²·hr·° C. The temperature of the drying air is adjusted to 130° C. on the upstream side on an upper portion of the band, and to 135° C. on the downstream side. Further, the temperature of a lower portion of the band is adjusted to 65° C. The saturated temperature of each of the respective gases is around −8° C. The oxygen concentration in the drying atmosphere over the support is kept at 5 vol %. In order to keep the oxygen concentration at 5 vol %, the air is replaced by nitrogen gas. Further, in order to condense and collect the solvent in the casting chamber, a condenser is provided, and the outlet temperature thereof is set to −10° C.

The dope is prevented from being directly exposed to the drying air by a wind shielding device for 5 seconds after casting, thereby suppressing static pressure fluctuations in the vicinity of the casting die to ±1 Pa or less. At the time when the proportion of solvent in the dope reaches 45% by mass on the basis of dried amount, the cast dope is peeled off from the casting support as a film. The peeling tension at this time is 8 kgf/m. The peeling speed to the support speed (peeling roller draw) is adjusted so as to be properly peeled off within the range of 100.1% to 110%. Further, the surface temperature of the film thus peeled is 14° C. The drying speed on the support is 62% by mass of solvent on the basis of dried amount per minute on average. The solvent gas generated by drying is introduced into a condenser, condensed at −10° C., collected, and then, reused as a solvent for charging. The drying air from which the solvent is removed is heated again, and then, reused as a drying air. In that case, the amount of moisture contained in the solvent is adjusted to 0.5% or less, and then, reused. The film peeled off is conveyed by a transfer portion comprising a number of rollers. The transfer portion has three rollers, and the temperature thereof is kept at 40° C. When the film is conveyed by the rollers of the transfer portion, a tension of 16 N to 160 N is imparted to the film.

(2-5) Tenter Conveying-Drying Process Conditions

The film peeled off is conveyed into a drying zone of a tenter by the tenter having clips while being fixed at both edges thereof, and dried with a drying air. The clips are cooled by supplying a heat transfer medium of 20° C. The tenter is driven by a chain, and the speed fluctuation of a sprocket thereof is 0.5% or less. The tenter is divided into three zones, and the drying air temperatures of the respective zones are adjusted to 90° C., 100° C. and 110° C., respectively, from the upstream side. The gas composition of the drying air is the saturated gas concentration at −10° C. The average drying speed in the tenter is 120% by mass/min (solvent on the basis of dried amount). Adjustment is made so that the amount of residual solvent in the film becomes 10% by mass or less at an outlet of the tenter. In the production of this film, the conditions of the drying zones are adjusted to 7% by mass. In the tenter, the film is also stretched in a width direction while being conveyed. When the width of the film conveyed to the tenter is taken as 100%, the widened width thereof is adjusted to 103%. The stretch ratio between a peeling roller and an inlet of the tenter (tenter drive draw) is adjusted to 102%. For the stretch ratio in the tenter, the difference in substantial stretch ratio between a gripping portion of the tenter and a portion 10 mm or more apart therefrom is 10% or less, and the difference in stretch ratio between any two points 20 mm apart is 5% or less.

The ratio of the length fixed with the tenter of the base ends is adjusted to 90%. Further, the film is conveyed while cooling the tenter clips so as not to exceed 50° C. The solvent evaporated in the tenter portion is condensed at a temperature of −10° C., and then collected. A condenser is provided for condensation and collection, and the temperature of an outlet thereof is set to −8° C. The amount of moisture contained in the solvent is adjusted to 0.5% by mass or less, and then, reused.

Then, the film is trimmed at the both edges thereof within 30 seconds after the film leaves the outlet of the tenter. Using an NT type cutter, the film is trimmed by 50 mm at the both edges thereof. The oxygen concentration in a drying atmosphere in the tenter is kept at 5 vol %. In order to keep the oxygen concentration at 5 vol %, the air is replaced by nitrogen gas. Prior to being dried at high temperature in a roller conveying zone described later, the film is pre-heated in a pre-drying zone into which a drying air of 100° C. is being supplied.

(2-6) Post-Drying Process Conditions

The trimmed polymer film obtained by the above-mentioned method is dried at high temperature in the roller conveying zone. The roller conveying zone is divided into four compartments, and the drying airs of 120° C., 130° C., 130° C. and 130° C. are each supplied into the four compartments, respectively, in this order from the upstream side thereof. At this time, the roller conveying tension of the film is adjusted to 100 N/m, and the film is dried for about 10 minutes until the residual solvent amount finally reaches 0.3% by mass. As the lapping angles of the roller, 90 degrees and 180 degrees are used. A material of the roller is aluminum or carbon steel, and a surface of the roller is plated with hard chromium. The surface of the roller is flat or matted by blasting. Fluctuations due to the rotation of the rollers are all 50 μm or less. Further, deflection of the roller at a tension of 100 N/m is selected to 0.5 mm or less.

A forced antistatic eliminating device (antistatic eliminating bar) is installed in the process so as to keep the charged voltage of the film during conveyance to the range of −3 kV to +3 kV. Further, in a winding portion, not only the antistatic eliminating bar, but also an ionized air antistatic eliminating device is installed so as to adjust the charged voltage to −1.5 kV to +1.5 kV.

The dried film thus dried is conveyed to a first moisture conditioning chamber. A drying air of 110° C. is supplied to a transfer portion between the roller conveying zone and the first moisture conditioning chamber. An air having a temperature of 50° C. and a dew point of 20° C. is supplied to the first moisture conditioning chamber. Further, the film is conveyed to a second moisture conditioning chamber for inhibiting the occurrence of curling of the film. In the second moisture conditioning chamber, an air having a temperature of 90° C. and a humidity of 70% is brought into direct contact with the film.

(2-7) After-Treatment and Winding Conditions

The polymer film after dried is cooled to 30° C. or less, and trimmed at both edges. The film is trimmed by installing every two devices for slitting each of both edges of the film in each of both edge portions of the film (two slitting devices on one side) and slitting the both edges of the film. The slitting device used herein comprises a disk-shaped upper rotary blade and a roll-shaped lower rotary blade. A material of the upper rotary blade is a hard steel material, the diameter of the upper rotary blade is 200 mm, and the thickness of the blade at a cut place is 0.5 mm. A material of the roll-shaped lower rotary blade is a hard steel material, and the roll diameter of the lower rotary blade is 100 mm.

Then, the surface roughness (arithmetic average roughness: Ra) of a cross section of the film slit is measured. As a result, it is 0.2 μm. Further, the cross section of the slit film is relatively smooth, and no cut powder is observed. Furthermore, in the formation of the above-mentioned cellulose acylate film, there is no breakage of the film at all during conveyance thereof.

Here, the surface roughness of the film cross section is measured by using a surface roughness measuring instrument (New View 5010) manufactured by ZYGO Corp. under instrument conditions at an objective lens by a factor of 50 and an image zoom by a factor of 1.3. Further, in this case, measurement conditions are appropriately set with a Mesure Cntrl Key, and measured data is processed by appropriately setting an Analyze Cntrl Key.

The cellulose acylate film having a width of 1,500 mm and a film thickness of 80 μm is thus obtained, and wound with a winder. Further, the rate of dimensional change of the slit cellulose acylate film at a place having a width of 20 mm from the edge thereof is measured. Here, the rate of dimensional change is evaluated by taking the percentage of the dimension (length in a width direction) changed after the cellulose acylate film has been kept under circumstances of a temperature of 90° C. and a relative humidity of 5% for 120 hours to the dimension (length in a width direction) immediately after the production of the film. As a result, the rate of dimensional change of the cellulose acylate film at a place having a width of 20 mm from the edge thereof is −0.13%, which poses no problem.

Further, the film is knurled at both edges thereof. Knurling is carried out by embossing the film on one side thereof, and the knurling width is 10 mm. The pressing force is set so that the maximum height is 12 μm higher than the average thickness on average.

Then, the film is conveyed to a winding chamber. The winding chamber is kept at a room temperature of 25° C. and a humidity of 60%. The polymer film thus obtained has a product width of 1,500 mm. The tension pattern is set so that the diameter of a winding core is 169 mm, the tension at the start of winding is 390 N/width and the tension at the end of winding is 250 N/width. The total length of winding is 3,250 m. The oscillate pitch in winding is adjusted to 400 m, and the oscillate width is adjusted to ±5 mm. Further, the pressing force of a press roller against a winding roller is set to 50 N/width. In winding, the temperature of the film is 25° C., the moisture content thereof is 0.8% by mass, and the residual solvent content thereof is 0.2% by mass. The average drying speed is 20% by mass/min (solvent on the basis of dried amount) through all the processes. Neither loose winding nor wrinkling occurred, and no winding deviation occurs even at an impact test at 10 G. The external appearance of a film roll is good. Through the above-mentioned processes, a sample of the polymer film is formed. The roll of the film sample is stored in a storage rack at a temperature of 25° C. and a relative humidity of 55% for 1 month. Then, the film sample is examined in the same manner as described above. No significant changes are observed in all. Further, no adhesion is observed in the roll. After the formation of the film sample, no residue of the cast film formed from the dope and left unpeeled is observed on the endless belt as the metal support.

(Evaluation of Roll Contamination)

A: No contamination material is observed on the metal support.

B: A contamination material is slightly observed on the metal support.

C: A contamination material is considerably observed on the metal support.

D: A contamination material is observed over the entire surface of the metal support.

(Evaluation of Trimmed State)

A: The trimming width is 200 mm or less, and no scratches are observed in a trimmed edge portion enlarged 5-fold with a magnifying glass.

B: The trimming width is 200 mm or less, and small scratches are observed in a trimmed edge portion enlarged 5-fold with a magnifying glass.

C: The trimming width is 250 mm or more, and small scratches are observed in a trimmed edge portion enlarged 5-fold with a magnifying glass.

D: The trimming width is 250 mm or more, and many scratches are observed in a trimmed edge portion enlarged 5-fold with a magnifying glass.

4) Evaluation of Polymer Film

The surface state, haze, Re, Rth and ΔRth of the respective films prepared by changing the plasticizer are evaluated, and the results thereof are shown in Table 1.

(Evaluation of Heat Deposition)

The film of 10 cm square is conditioned under circumstances of 25° C. and 60% RH for 2 hours, and then, heated in a thermostatic chamber of 230° C. for 10 minutes. This heated film is taken out and allowed to stand under circumstances of 25° C. and 60% RH for 2 hours. Then, the state of a film surface is visually observed.

A: No deposited material is observed on the film surface.

B: A deposited material is slightly observed on the film surface.

C: A deposited material is considerably observed on the film surface.

D: A deposited material is observed over the entire surface on the film surface,

TABLE 1

| Name of Film | Cellulose Ester Kind | Plasticizer Kind | Plasticizer Amount Added (% by mass) (based on cellulose ester) | State of Surface | Roll Contamination | Trimmed State | Heat Deposition | Haze [%] | Re Average [nm] | Rth Average [nm] | ΔRth Average [nm] |
|---|---|---|---|---|---|---|---|---|---|---|---|
| Example 101 Comparison | Cellulose Ester A | — | — | B | A | D | — | 0.2 | 7 | 35 | 48 |
| Example 102 Comparison | Cellulose Ester A | Comparative Plasticizer A | 10 | A | C | C | A | 0.3 | 4 | 48 | 42 |

TABLE 1-continued

| Name of Film | | Cellulose Ester Kind | Plasticizer Kind | Plasticizer Amount Added (% by mass) (based on cellulose ester) | State of Surface | Roll Contamination | Trimmed State | Heat Deposition | Haze [%] | Re Average [nm] | Rth Average [nm] | ΔRth Average [nm] |
|---|---|---|---|---|---|---|---|---|---|---|---|---|
| Example 103 | Comparison | Cellulose Ester A | Comparative Plasticizer A | 20 | A | D | C | C | 0.3 | 3 | 42 | 39 |
| Example 104 | Comparison | Cellulose Ester A | Comparative Plasticizer B | 20 | A | C | C | B | 0.3 | 2 | 7 | 38 |
| Example 105 | Comparison | Cellulose Ester A | Comparative Plasticizer C | 20 | B | C | C | B | 0.5 | 3 | 26 | 40 |
| Example 106 | Comparison | Cellulose Ester A | Comparative Plasticizer D | 20 | A | C | C | C | 0.3 | 1 | 5 | 40 |
| Example 107 | Comparison | Cellulose Ester A | Comparative Plasticizer E | 20 | A | C | D | C | 0.3 | 3 | 7 | 39 |
| Example 108 | Invention | Cellulose Ester A | PP-15 | 10 | A | A | A | A | 0.2 | 0 | 6 | 33 |
| Example 109 | Invention | Cellulose Ester A | PP-15 | 20 | A | A | A | A | 0.2 | 1 | 1 | 34 |
| Example 110 | Invention | Cellulose Ester A | PP-10 | 20 | A | A | A | A | 0.2 | 0 | 2 | 34 |
| Example 111 | Invention | Cellulose Ester A | PP-11 | 10 | A | A | A | A | 0.2 | 1 | 2 | 33 |
| Example 112 | Invention | Cellulose Ester A | PP-17 | 10 | A | A | A | A | 0.2 | 1 | 2 | 35 |
| Example 113 | Invention | Cellulose Ester A | PP-18 | 10 | A | A | A | A | 0.2 | 1 | 3 | 34 |
| Example 114 | Invention | Cellulose Ester A | PP-21 | 10 | A | A | A | A | 0.2 | 0 | 2 | 33 |
| Example 201 | Invention | Cellulose Ester B | PP-10 | 10 | A | A | A | A | 0.2 | 1 | 1 | 33 |
| Example 202 | Invention | Cellulose Ester C | PP-10 | 10 | A | A | A | A | 0.2 | 2 | 1 | 34 |
| Example 203 | Invention | Cellulose Ester D | PP-10 | 10 | A | A | A | A | 0.3 | 0 | 0 | 33 |
| Example 204 | Invention | Cellulose Ester E | PP-10 | 10 | A | A | A | A | 0.3 | 1 | 1 | 34 |
| Example 301 | Invention | Cellulose Ester A | PP-10 | 20 | A | A | A | A | 0.2 | 6 | 68 | 31 |
| Example 401 | Invention | Cellulose Ester A | PP-10 | 20 | A | A | A | A | 0.3 | 2 | 5 | 35 |
| Example 501 | Invention | Cellulose Ester A | PP-10 | 20 | A | A | A | A | 0.3 | 60 | 120 | 27 |
| Example 901 | Invention | Cellulose Ester A | PP-10 | 20 | A | A | A | A | 0.2 | 0 | 5 | 20 |
| Example 902 | Invention | Cellulose Ester A | PP-10 | 20 | A | A | A | A | 0.2 | 0 | 3 | 18 |

Comparative Plasticizer A: Triphenyl phosphate
Comparative Plasticizer B: A condensate comprising adipic acid/ethanediol (molar ratio: 1/1) (number average molecular weight: 2,500).
Comparative Plasticizer C: A condensate comprising terephthalic acid/ethanediol (molar ratio: 1/1) (number average molecular weight: 900).
Comparative Plasticizer D: A condensate comprising succinic acid/ethanediol (molar ratio: 1/1) (number average molecular weight: 1,500), both ends of which are 2-ethylhexyl-esterified.
Comparative Plasticizer E: A condensate comprising succinic acid/ethanediol (molar ratio: 1/1) (number average molecular weight: 1,500), both ends of which are benzoate-esterified.

As shown in Table 1, the film of Comparative Example 101 in which no plasticizer is used is poor in trimmed state and high in ΔRth, so that it is inferior as a film. Further, the films of Comparative Examples 102 and 103 in which comparative plasticizer A, a low molecular weight plasticizer, is used can not satisfy all the roll contamination, the trimmed state and the heat deposition. Furthermore, the films of Comparative Examples 104 to 107 in which comparative plasticizer similar to the raw material of the invention is used can not similarly satisfy all the roll contamination, the trimmed state and the heat deposition. In addition, the humidity dependency (ΔRth) of Rth is also high.

Compared to this, the films of Examples 108 to 114 of the invention satisfy all the roll contamination, the trimmed state and the heat deposition, and are low in the humidity dependency (ΔRth) of Rth. Thus, these films have excellent characteristics and are also low in optical characteristics.

Example 2

Preparation and Evaluation of Transparent Polymer Film

Films of Examples 201 to 204 of the invention are prepared in the same manner as in Example 110 in Example 1 with the exception that cellulose ester A is substituted by cellulose esters B to E. As described in Table 1, these films satisfy all the roll contamination, the trimmed state and the heat deposition, and are low in the humidity dependency (ΔRth) of Rth. Thus, these films have excellent characteristics and are also low in optical characteristics.

Here, cellulose esters B to E will be described below.
Cellulose Ester B:

A powder of cellulose triacetate having a substitution degree of 2.49, a viscosity-average polymerization degree of 280, a moisture content of 0.2% by mass, a 6% by mass viscosity in a methylene chloride solution of 260 mPa·s, an average particle size of 1.5 mm and a standard deviation thereof of 0.4 mm. The residual acetic acid amount is 0.02% by mass or less, the Ca content is 0.0005% by mass, the Mg content is 0.004% by mass, the K content is 3 ppm, the Na content is 2 ppm, the Fe content is 0.5 ppm, and the sulfur (present as sulfuric acid groups) content is 29 ppm. The number average molecular weight (Mn) is 84,000, the weight average molecular weight (Mw) is 238,000, and Mw/Mn is 2.8. Further, the 6-position acetyl group is 0.85, and the total of the degree of substitution at the 6-position is 34% of all acetyl groups, the yellowness index is 0.4, the haze is 0.07, the transparency is 92.7%, the Tg is 152° C. and the crystallization exothermic amount is 3.1 J/g. Furthermore, it has physical properties such as a repose angle of 38 degrees, a bulk density of 0.55 g/cm³, a tap density of 0.60 g/cm³ and a degree of compaction of 8%. In addition, cellulose ester B is dissolved in each of mixed solvents of methylene chloride/methanol (92/8 and 80/20 by mass ratio) at room temperature (25° C.), and 20 kg of each resulting solution is allowed to pass through a filter having an average pore size of 10 μm and a thickness of 1 mm. Then, the filter was thoroughly washed with each solvent, and an increase in mass of a SUS filter is measured. As a result, the mass increasing rate thereof is 0.05% in the case of methylene chloride/methanol (92/8 by mass ratio), and 0.09% in, the case of methylene chloride/methanol (80/20 by mass ratio).

Cellulose Ester C:

A powder of cellulose acetate propionate having an acetyl substitution degree of 1.90, a propionyl substitution degree of 0.75, a viscosity-average polymerization degree of 260, a moisture content of 0.1% by mass, a 6% by mass viscosity in a methylene chloride solution of 245 mPa·s, an average particle size of 0.9 mm and a standard deviation thereof of 0.4 mm. The residual acetic acid amount is 0.008% by mass, the residual propionic acid amount is 0.007% by mass, the Ca content is 0.0012% by mass, the Mg content is 0.005% by mass, the K content is 3 ppm, the Na content is 2 ppm, the Fe content is 2 ppm, the sulfur content is 28 ppm, and the total amount of the other metals is 2 ppm or less. The 6-position acetyl group and the 6-position propionyl group are 0.70 and 0.25, respectively, and the total of the degree of substitution at the 6-position is 36% of all substituent groups. The weight average molecular weight (Mw) is 220,000, the number average molecular weight (Mn) is 69,000, and the ratio thereof (Mw/Mn) is 3,2. The yellowness index is 0.8, the haze is 0.2, the transparency is 93.0%, the Tg is 146° C. and the crystallization exothermic amount is 3.3 J/g. It has physical properties such as a repose angle of 33 degrees, a bulk density of 0.35 g/cm³, a tap density of 0.40 g/cm³ and a degree of compaction of 25%. Further, cellulose ester C is dissolved in each of mixed solvents of methylene chloride/methanol (92/8 and 80/20 by mass ratio) at room temperature (25° C.), and 20 kg of each resulting solution is allowed to pass through a filter having an average pore size of 10 μm and a thickness of 1 mm. Then, the filter was thoroughly washed with each solvent, and an increase in mass of a SUS filter is measured. As a result, the mass increasing rate thereof is 0.05% in the case of methylene chloride/methanol (92/8 by mass ratio), and 0.09% in the case of methylene chloride/methanol (80/20 by mass ratio).

Cellulose Ester D:

A powder of cellulose acetate butyrate having an acetyl substitution degree of 1.69, a butyryl substitution degree of 1.25, a total substitution degree of 2.94, a viscosity-average polymerization degree of 300, a moisture content of 0.1% by mass, a 6% by mass viscosity in a methylene chloride solution of 225 mpa·s, an average particle size of 1.0 mm and a standard deviation thereof of 0.4 mm. The residual acetic acid amount is 0.01% by mass, the residual butanoic acid amount is 0.05% by mass, the Ca content is 3 ppm, the Mg content is 30 ppm, the K content is 1 ppm, the Na content is 3 ppm, the Fe content is 0.9 ppm, and the sulfur (present as sulfuric acid groups) content is 28 ppm. The 6-position acetyl group and the 6-position butyryl group are 0.51 and 0.45, respectively, and the total of the degree of substitution at the 6-position is 33% of all substituent groups. The weight average molecular weight (Mw) is 220,000, the number average molecular weight (Mn) is 68,000, and the ratio thereof (Mw/Mn) is 3.2. The yellowness index is 0.9, the haze is 0.5, the transparency is 92.9%, the Tg is 153° C. and the crystallization exothermic amount is 3.9 J/g.

Cellulose Ester E:

A powder of cellulose acetate benzoate having an acetyl substitution degree of 1.89, a benzoyl substitution degree of 0.98, a total substitution degree of 2.87, a viscosity-average polymerization degree of 290, a moisture content of 0.4% by mass, a 6% by mass viscosity in a methylene chloride solution of 320 mPa·s, an average particle size of 1.5 mm and a standard deviation thereof of 0.4 mm. Both the residual acetic acid amount and the residual benzoic acid are 0.03% by mass or less, the Ca content is 0.0002% by mass, the Mg content is 0.0003% by mass, the K content is 4 ppm, the Na content is 9 ppm, the Fe content is 0.5 ppm, and the sulfur (present as sulfuric acid groups) content is 3 ppm. The number average molecular weight (Mn) is 68,000, the weight average molecular weight (Mw) is 194,000, and the ratio thereof (Mw/Mn) is 2.9. The 6-position acetyl group and the 6-position benzoic acid group are 0.82 and 0.06, respectively, and 33% of all substituent groups. The yellowness index is 0.5, the haze is 0.6, the transparency is 93.4%, the Tg is 133° C. and the crystallization exothermic amount is 5.2 J/g.

Example 3

Preparation and Evaluation of Transparent Polymer Film

A film of Example 301 of the invention is prepared in the same manner as in Example 110 in Example 1 with the exception that following additive A is further added in an amount of 0.3% by mass (based on the polymer). As described in Table 1, this film satisfies all the roll contamination, the trimmed state and the heat deposition, and is low in the humidity dependency (ΔRth) of Rth. Thus, this film has excellent characteristics.

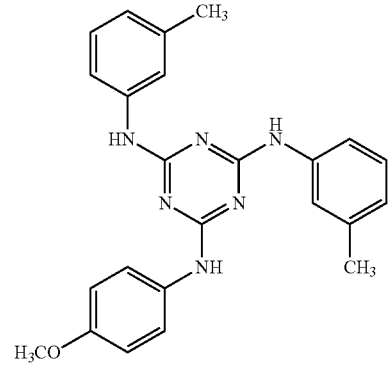

Additive TA-1

Example 4

Preparation and Evaluation of Transparent Polymer Film

A film of Example 401 (the invention) is obtained in the same manner as in Example 110 in Example 1 with the exception that the film is prepared by a film forming process according to the following film preparation method using the solution prepared by "1) Preparation of Polymer Solution" in Example 1.

(Film Forming Process of Film 401)

The above-mentioned polymer solution is heated at 30° C., and casted on a mirror-surface stainless steel support, a drum having a diameter of 3 m, through a casting giesser. The surface temperature of the support is set to −5° C., and the coating width is 1470 mm. The space temperature of the whole casting section is set to 15° C. Then, the cellulose ester film which has been cast and rotated is peeled off from the drum at a position 50 cm before a terminal portion of the casting section, and then, clipped at both edges thereof with a pin tenter. The residual solvent amount of the cellulose acylate web immediately after peeled off, the peeling speed to the support speed (peeling roller draw), and the film surface temperature of the cellulose acylate web is 5° C.

The cellulose acylate web held with the pin tenter is conveyed to a drying zone. In initial drying, a drying air of 45° C. is sent. Then, the web is dried at 110° C. for 5 minutes and further dried at 140° C. for 10 minutes. Just before winding, the web is trimmed at the both edges thereof (each 5% of the entire width), and then, subjected to t thickness increasing processing (knurling) of 10 mm in width and 50 µm in height at the both edges. Thereafter, 3,000 m of the web is wound in a roll form. The transparent film thus obtained has a width of 1.45 m and a film thickness of 80 µm. As described in Table 1, this film satisfies all the roll contamination, the trimmed state and the heat deposition, and is low in the humidity dependency (ΔRth) of Rth. Thus, this film has excellent characteristics.

Example 5

Preparation and Evaluation of Transparent Polymer Film

The film of Example 301 of the invention obtained in Example 4 is further stretched by the following method to obtain film 501 (the invention). That is to say, the film of Example 301 is held at both edges thereof with tenter clips, and then, stretched in a heating zone in a direction perpendicular to a transfer direction (example film 501). The temperature of the heating zone is adjusted to 160° C., and the film is stretched by 20%. Incidentally, the stretch ratio is determined according to the following equation by drawing marked lines on the film at a predetermined distance in a direction parallel to the transfer direction of the film, and measuring the distance before and after stretching.

Stretch ratio (%)=100×(the distance between marked lines after stretching−the distance between marked lines before stretching)/(the distance between marked lines before stretching)

The film of Example 501 thus obtained by re-stretching has an Re of 60 and an Rth of 140, satisfies all the roll contamination, the trimmed state and the heat deposition, and is low in the humidity dependency (ΔRth) of Rth. Thus, this film has excellent characteristics. In particular, Rth can be decreased, so that this film can be applied as an excellent phase difference film.

Example 6

Preparation and Evaluation of Laminated Phase Difference Film

The polymer film of the invention can be used as a phase difference film as it is. However, films are laminated by a roll-to-roll method using a pressure sensitive adhesive herein, thereby preparing a phase difference film controlled in the Rth/Re ratio. A Fujitack TD80UF film (manufactured by Fuji Photo Film Co., Ltd.) and the film of Example 501 are laminated by the roll-to-roll method using a pressure sensitive adhesive (comprising poly(methyl acrylate/butyl acrylate/hydroxyethyl acrylate), toluene diisocyanate and diglycidyl ethylene glycol) to obtain a laminated film having an Re of 63 nm and an Rth of 155 nm. Further, the slow axis of Re of this phase difference film is observed in a width direction of the film, and the surface state is excellent as a polarizing plate.

Example 7

Preparation and Evaluation of Polarizing Plate

1) Saponification of Film

The film of Example 110 is immersed in a 1.5-mol/L aqueous NaOH solution (saponification solution) kept at 55° C. for 2 minutes, and then, washed with water. Thereafter, the film is immersed in a 0.05-mol/L at 25° C. aqueous sulfuric acid solution for 30 seconds, and then, further allowed to pass through a washing bath under running water for 30 seconds to make the film neutral. Then, the draining off of water is repeated three times with an air knife. After removal of water, the film is allowed to stay in a drying zone at 70° C. for 15 seconds to dry it, thereby preparing a saponified film. The resulting film is also excellent in the surface state, and approximately maintains the characteristics such as the optical characteristics before saponification.

2) Preparation of Polarizing Film

According to Example 1 in JP-A-2001-141926, the film is stretched in a longitudinal direction between two pairs of nip rolls running at different peripheral speeds, thereby preparing a polarizing film having a thickness of 20 µm.

3) Lamination

The polarizing film thus obtained is sandwiched between the above-mentioned saponified films with saponified faces of the films disposed on the polarizing film side, and then, they are laminated in such a manner that a polarizing axis and a longitudinal direction of the films cross at right angles, by using a 3% PVA (PVA-117H manufactured by Kuraray) aqueous solution as an adhesive, thereby preparing polarizing plate 7001.

4) Evaluation of Polarizing Plate (Initial Degree of Polarization)

The degree of polarization of the above-mentioned polarizing plate is calculated by the following method. The initial degree of polarization, the degree of polarization 1 after aging and the degree of polarization 2 after aging are all 99.9%, and the polarizing plate shows excellent polarizing plate characteristics.

(Degree of Polarization 1 after Aging)

One film side of the above-mentioned polarizing plate is adhered to a glass plate with an adhesive, followed by standing under conditions of 60° C. and a relative humidity of 95% for 500 hours. The degree of polarization after standing (the degree of polarization after aging) is calculated by the above-mentioned method.

(Degree of Polarization 2 After Aging)

One film side of the above-mentioned polarizing plate is adhered to a glass plate with an adhesive, followed by standing under conditions of 90° C. and a relative humidity of 0% for 500 hours. The degree of polarization after standing (the degree of polarization after aging) is calculated by the above-mentioned method. As a result, a decrease in the degree of polarization is 0.1% or less, and this is at a level where it poses little problem for a product.

Example 8

Preparation and Evaluation of Liquid Crystal Display Device

The polarizing plate produced in Example 7 is incorporated in an IPS-type liquid crystal display device (32 V-type high-definition liquid crystal TV monitor, W32-L7000) manufactured by Hitachi, Ltd., in place of the polarizing plate originally incorporated therein. As a result, view angle characteristics are improved. This effect is confirmed either when observed after the liquid crystal display device has been allowed to stand under low humidity conditions (25° C. and a relative humidity of 10%) for 500 hours, or when observed after it has been allowed to stand under high humidity conditions (25° C. and a relative humidity of 80%) for 500 hours.

Example 9

Preparation and Evaluation of Transparent Polymer Film

In Example 110 of the invention in Example 1, the film thickness is changed to 60 μm and 40 μm, respectively, to obtain films of Example 901 and Example 902 of the invention. As shown in Table 1, these films satisfy all the roll contamination, the trimmed state and the heat deposition, and are low in the humidity dependency (ΔRth) of Rth. Thus, these films have excellent characteristics. In particular, Rth can be decreased, so that these films can be applied as useful phase difference films.

Example 10

Preparation and Evaluation of Polarizing Plate

Polarizing Plates 1001 and 1002 are prepared in the same manner as in Example 7 with the exception that the film of Example 110 used in Example 7 is changed to the films of Examples 901 and 902. The following evaluation is made according to "4) Evaluation of Polarizing Plate" of Example 7. As a result, it is confirmed that they are excellent polarizing plates, similarly to that in Example 7. That is to say, the initial degree of polarization, the degree of polarization 1 after aging and the degree of polarization 2 after aging are all 99.9%, and they show excellent polarizing plate characteristics.

Example 11

Preparation and Evaluation of Liquid Crystal Display Device

Each of polarizing plates 1001 and 1002 produced in Example 10 is incorporated in an IPS-type liquid crystal display device (32 V-type high-definition liquid crystal TV monitor, W32-L7000) manufactured by Hitachi, Ltd., in place of the polarizing plate originally incorporated therein. As a result, view angle characteristics are improved. This effect is confirmed either when observed after the liquid crystal display device has been allowed to stand under low humidity conditions (25° C. and a relative humidity of 10%) for 500 hours, or when observed after it has been allowed to stand under high humidity conditions (25° C. and a relative humidity of 80%) for 500 hours.

According to the invention, a transparent polymer film can be easily produced by selecting a specific high molecular weight plasticizer. Further, according to the invention, smoke generation and oil contamination during a production process can be avoided, and a film having good trimming properties can be provided. The polymer film provided according to the invention can be widely applied for optical applications such as phase difference films. Further, the polymer film of the invention has a proper moisture permeability, so that it can be laminated online to a polarizing film. Thus, a polarizing plate having excellent visibility can be provided with good productivity. Furthermore, a liquid crystal display device having high reliability can be provided. Accordingly, the industrial applicability of the invention is high.

The entire disclosure of each and every foreign patent application from which the benefit of foreign priority has been claimed in the present application is incorporated herein by reference, as if fully set forth.

What is claimed is:

1. A polymer film comprising:
a cellulose acylate,
wherein
a degree of substitution of acetyl groups substituted at the hydroxyl groups of the cellulose of the cellulose acylate is taken as SA, and a degree of substitution of acyl groups with 3 or more carbon atoms substituted at the hydroxyl groups of the cellulose of the cellulose acylate is taken as SB,
wherein $$2.40 \leq SA+SB \leq 3.00;\text{ and}$$

a high molecular weight plasticizer that has a number average molecular weight of 700 to 10,000 and has a repeating unit derived from a dicarboxylic acid and a diol,
wherein
the dicarboxylic acid for forming the high molecular weight plasticizer comprises at least one aliphatic dicarboxylic acid having 2 to 20 carbon atoms and at least one aromatic dicarboxylic acid having 8 to 20 carbon atoms, and
the diol comprises at least one diol selected from the group consisting of an aliphatic diol having 2 to 12 carbon atoms, an alkyl ether diol having 4 to 20 carbon atoms and an aromatic ring-containing diol having 6 to 20 carbon atoms,
wherein
both ends of the high molecular weight plasticizer are at least one selected from the group consisting of an aliphatic group having 1 to 22 carbon atoms, an aromatic ring-containing group having 6 to 20 carbon atoms, an aliphatic carbonyl group having 1 to 22 carbon atoms, and an aromatic carbonyl group having 6 to 20 carbon atoms,
wherein
the high molecular weight plasticizer is contained in an amount of 2 to 30% by mass based on an amount of the polymer, and
wherein
the retardation values meet the following relational expressions:

$$|Re(10\%)-Re(85\%)|<8 \text{ and}$$

$$|Rth(10\%)-Rth(85\%)|<35,$$

wherein
the retardation values Re (H %) in the in-plane direction and Rth (H %) in the thickness direction at the time when the relative humidity is H (unit: %) are obtained by conditioning the film at 25° C. and a humidity of H % for 24 hours, and then measuring and calculating the retardation values at the time when the wavelength at a relative humidity of H % and 25° C., is 590 nm.

2. The polymer film according to claim 1, wherein the aliphatic dicarboxylic acid is a malonic acid, a succinic acid, a glutaric acid, an adipic acid, a sebacic acid, an azelaic acid, a cyclohexanedicarboxylic acid, a maleic acid or a fumaric acid, and the aromatic dicarboxylic acid is a phthalic acid, an isophthalic acid, a terephthalic acid, a 1,5-naphthalenedicarboxylic acid, a 1,4-naphthalenedicarboxylic acid, a 1,8-naphthalene-dicarboxylic acid, a 2,8-naphthalenedicarboxylic acid or a 2,6-naphthalenedicarboxylic acid.

3. The polymer film according to claim 1, wherein the aliphatic diol is an ethanediol, a 1,2-propanediol, a 1,3-propanediol, a 1,2-butanediol, a 1,3-butanediol, a 2-methyl-1,3-propanediol, a 1,4-butanediol, a 1,5-pentanediol, a 2,2-dimethyl-1,3-propanediol (neopentyl glycol), a 1,4-hexanediol, a 1,4-cyclohexanediol or a 1,4-cyclohexanedimethanol, and the aromatic ring-containing diol is a bisphenol A, a 1,4-dihydroxyphenol or a benzene-1,4-dimethanol.

4. The polymer film according to claim 1, wherein the high molecular weight plasticizer contains a component having a number average molecular weigh of 500 or less in an amount of 10% by mass or less.

5. The polymer film according to claim 1, wherein the high molecular weight plasticizer has a rate of mass decrease of at least either 5% or less when the high molecular weight plasticizer is heated at 200° C. for 10 minutes or 1% or less when the high molecular weight plasticizer is heated at 140° C. for 60 minutes.

6. The polymer film according to claim 1, wherein the polymer film is a cellulose acylate film prepared by a solution film forming method or a melt film forming method, and having a film thickness of from 20 to 200 gm.

7. The polymer film according to claim 1, wherein the polymer film is stretched 60 to 400% during or after film formation.

8. The polymer film according to claim 1, wherein the polymer film has an in-plane retardation (Re) of 0 to 300 nm, and a retardation in a thickness direction (Rth) of −200 to +300 nm.

9. A polarizing plate comprising:
at least one polymer film according to claim 1.

10. A liquid crystal display device comprising:
at least one polymer film according to claim 1.

11. The polymer film according to claim 1, wherein the both ends of the high molecular weight plasticizer are an aliphatic group having 1 to 22 carbon atoms or an aromatic ring-containing group having 6 to 20 carbon atoms, and
the aliphatic group and the aromatic ring-containing group of the both ends are blocked via an ester bond.

* * * * *